US012542981B2

United States Patent
Berner et al.

(10) Patent No.: US 12,542,981 B2
(45) Date of Patent: Feb. 3, 2026

(54) PHOTORECEPTOR MODULE AND SOLID-STATE IMAGING DEVICE

(71) Applicant: Sony Semiconductor Solutions Corporation, Atsugi (JP)

(72) Inventors: Raphael Berner, Stuttgart (DE); Massimo Zannoni, Stuttgart (DE)

(73) Assignee: Sony Semiconductor Solutions Corporation, Kanagawa (JP)

( * ) Notice: Subject to any disclaimer, the term of this patent is extended or adjusted under 35 U.S.C. 154(b) by 323 days.

(21) Appl. No.: 18/039,287

(22) PCT Filed: Nov. 25, 2021

(86) PCT No.: PCT/EP2021/083002
§ 371 (c)(1),
(2) Date: May 30, 2023

(87) PCT Pub. No.: WO2022/122398
PCT Pub. Date: Jun. 16, 2022

(65) Prior Publication Data
US 2024/0015416 A1    Jan. 11, 2024

(30) Foreign Application Priority Data
Dec. 11, 2020  (EP) ................... 20213622

(51) Int. Cl.
*H04N 25/77*  (2023.01)
*H04N 25/707*  (2023.01)
*H04N 25/78*  (2023.01)
(52) U.S. Cl.
CPC ........... *H04N 25/77* (2023.01); *H04N 25/707* (2023.01); *H04N 25/78* (2023.01)
(58) Field of Classification Search
CPC ....... H04N 25/77; H04N 25/707; H04N 25/78
See application file for complete search history.

(56) References Cited

U.S. PATENT DOCUMENTS

2016/0227135 A1\*  8/2016  Matolin ................. H04N 23/71
2020/0084403 A1    3/2020  Suh et al.
(Continued)

FOREIGN PATENT DOCUMENTS

EP        3576404 A1    12/2019
WO    2020/090460 A1    5/2020
(Continued)

OTHER PUBLICATIONS

International Search Report and Written Opinion mailed on May 16, 2022, received for PCT Application PCT/EP2021/083002, filed on Nov. 25, 2021, 19 pages.
(Continued)

*Primary Examiner* — Lin Ye
*Assistant Examiner* — Fayez A Bhuiyan
(74) *Attorney, Agent, or Firm* — XSENSUS LLP

(57) ABSTRACT

A photoreceptor module (PR) includes a photoelectric conversion element (PD), a first amplifier circuit (110) and a second amplifier circuit (120). The first amplifier circuit (110) includes a first amplifier portion (112) and a first feedback portion (114), wherein an input of the first amplifier portion (112) and a cathode (C) of the photoelectric conversion element (PD) are electrically connected. The second amplifier circuit (120) includes a second amplifier portion (122) and a second feedback portion (124), wherein controlled path of the second feedback portion (124), a controlled path of the first feedback portion (114), and the photoelectric conversion element (PD) are electrically connected in series.

20 Claims, 21 Drawing Sheets

(56) References Cited

U.S. PATENT DOCUMENTS

2020/0154064 A1  5/2020  Berner et al.
2020/0169681 A1  5/2020  Stobie et al.

FOREIGN PATENT DOCUMENTS

WO    2021/044299 A1    3/2021
WO    WO-2021172145 A1  9/2021

OTHER PUBLICATIONS

Yang et al., "A Dynamic Vision Sensor With 1% Temporal Contrast Sensitivity and In-Pixel Asynchronous Delta Modulator for Event Encoding", IEEE Journal of Solid-State Circuits, vol. 50, No. 9, Sep. 2015, pp. 2149-2160.
Brandi et al., "A 240 x 180 130 dB 3 μs Latency Global Shutter Spatiotemporal Vision Sensor", IEEE Journal of Solid-State Circuits, vol. 49, No. 10, Oct. 2014, pp. 2333-2341.
Lee et al., "Wide Dynamic Range CMOS Image Sensor Using Dual-Sensitivity Photodiodes and Switching Circuit", Int'l Conf. IP, Comp. Vision, and Pattern Recognition | IPCV'17 |, 2017, pp. 143-144.

\* cited by examiner

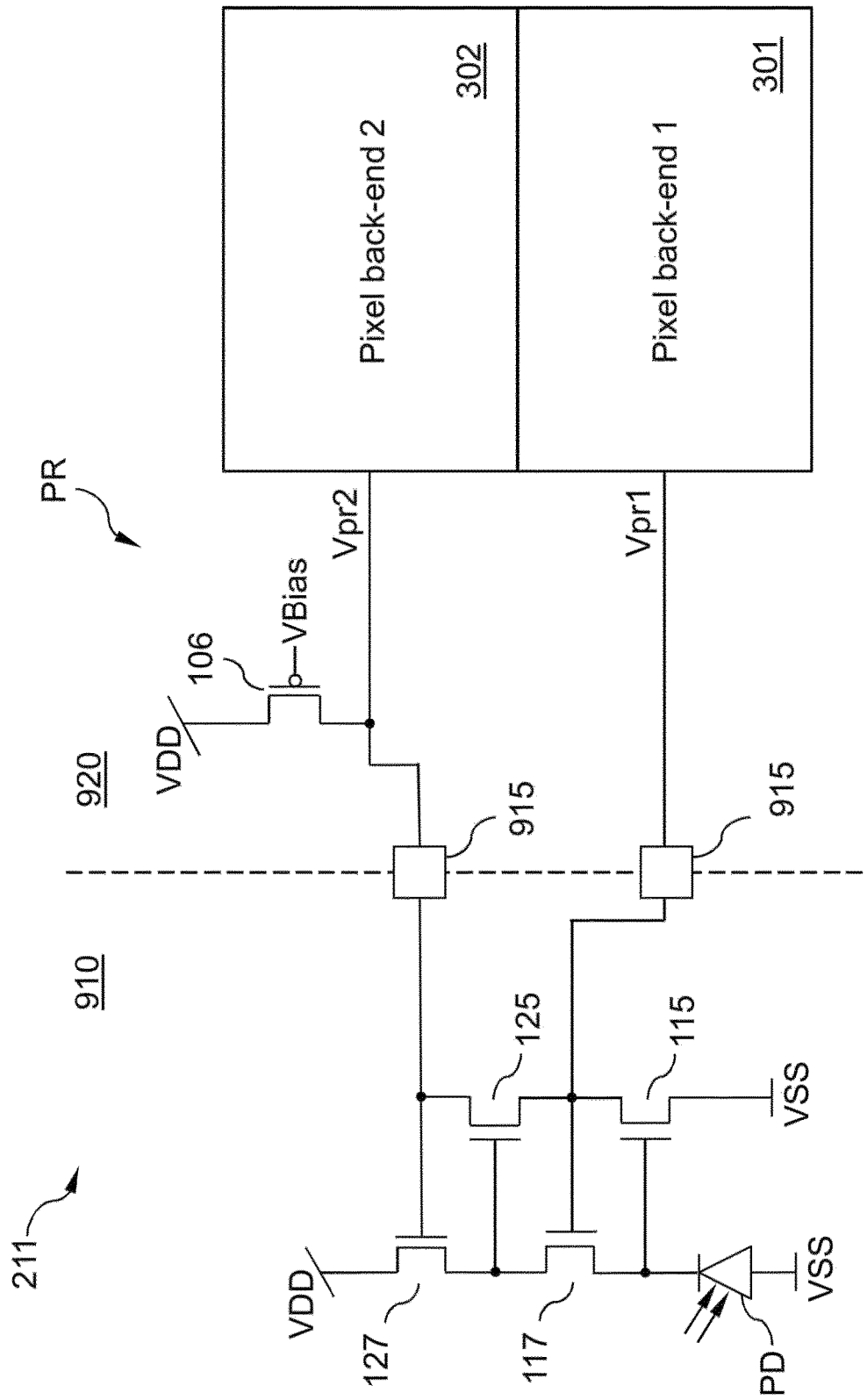

PHOTORECEPTOR MODULE AND SOLID-STATE IMAGING DEVICE

CROSS-REFERENCE TO RELATED APPLICATIONS

The present application is based on PCT filing PCT/EP2021/083002, filed Nov. 25, 2021, and claims priority to EP Application Serial No. 20213622.2, filed Dec. 11, 2020, the entire contents of each are incorporated herein by reference.

FIELD OF THE INVENTION

The present disclosure relates to a photoreceptor module and a solid-state imaging device. In particular, the present disclosure is related to the field of event detection sensors reacting to changes in light intensity, such as dynamic vision sensors (DVS).

BACKGROUND

Computer vision deals with how machines and computers can gain high-level understanding from digital images or videos. Typically, computer vision methods aim at excerpting, from raw image data obtained through an image sensor, that type of information the machine or computer uses for other tasks.

Many applications such as machine control, process monitoring or surveillance tasks are based on the evaluation of the movement of objects in in the imaged scene. Conventional image sensors with a plurality of pixels arranged in an array of pixels deliver a sequence of still images (frames). Detecting moving objects in the sequence of frames typically involves elaborate and expensive image processing methods.

Event detection sensors like DVS tackle the problem of motion detection by delivering only information about the position of changes in the imaged scene. Unlike image sensors that transfer large amounts of image information in frames, transfer of information about pixels that do not change may be omitted, resulting in a sort of in-pixel data compression. The in-pixel data compression removes data redundancy and facilitates high temporal resolution, low latency, low power consumption, and high dynamic range with little motion blur. DVS are thus well suited especially for solar or battery powered compressive sensing or for mobile machine vision applications where the motion of the system including the image sensor has to be estimated and where processing power is limited due to limited battery capacity. In principle the architecture of DVS allows for high dynamic range and good low-light performance.

It is desirable to utilize and pushing further the inherent high dynamic range, high temporal resolution and good low-light performance of photoreceptor modules, image sensors adapted for event detection like DVS.

SUMMARY OF INVENTION

Typically, a photoreceptor module (photoreceptor circuit block) for an image sensor adapted for event detection includes a photoelectric conversion element and a photoreceptor circuit, wherein the photoreceptor circuit includes an amplifier circuit with an amplifier portion and a feedback portion. A capacitance effective between the output of the amplifier portion and the input of the amplifier portion affects both the signal-to-noise ratio (SNR) and the pixel latency. A high capacitance improves the SNR but increases the pixel latency. Increased pixel latency deteriorates the temporal resolution of the photoreceptor module.

The embodiments of the present disclosure mitigate insufficiencies of conventional photoreceptor modules of image sensors adapted for event detection.

According to an embodiment a photoreceptor module includes a photoelectric conversion element, a first amplifier circuit and a second amplifier circuit. The first amplifier circuit includes a first amplifier portion and a first feedback portion. An input of the first amplifier portion and a cathode of the photoelectric conversion element are electrically connected. The second amplifier circuit includes a second amplifier portion and a second feedback portion. The photoelectric conversion element, a controlled path of the first feedback portion, and a controlled path of the second feedback portion are electrically connected in series.

Different capacitive structures are effective for a first output signal of the first amplifier portion and for a second output signal of the second amplifier portion. By appropriately selecting and/or combining the evaluation and/or signal processing of the first output signal and the second output signal, the photoreceptor module may provide output signals with low SNR and/or with low pixel latency.

According to another embodiment a photoreceptor module includes a photoelectric conversion element, an amplifier circuit, a configurable capacitance element, and a pixel back-end. An input of the amplifier circuit and a cathode of the photoelectric conversion element are electrically connected. The capacitance element is electrically connected between an output of the amplifier circuit and the input of the amplifier circuit. A capacitance of the capacitance element is adjustable through a control signal applied to an input of the capacitance element. An output of the first amplifier circuit and an input of the pixel back-end are electrically connected.

By properly controlling the capacitance of the capacitance element, the photoreceptor module may provide output signals with low SNR and/or with low pixel latency and may be adapted to different conditions of the imaged scene.

Electrically connected electronic elements may be electrically connected through a direct, permanent low-resistive connection, e.g., through a conductive line. The term "electrically connected" may include connection through other electronic elements provided and suitable for permanent and/or temporary signal transmission and/or transmission of energy. For example, electronic elements may be electrically connected through electronic switches such as transistors or transistor circuits, e.g. MOSFETs, transmission gates, and others.

BRIEF DESCRIPTION OF THE DRAWINGS

FIG. 14 is a schematic circuit diagram of another pixel with elements of the photoreceptor module and a photoelectric conversion element formed on a first chip of a solid-state imaging device with laminated structure according to an embodiment.

DETAILED DESCRIPTION

Figure 1A:
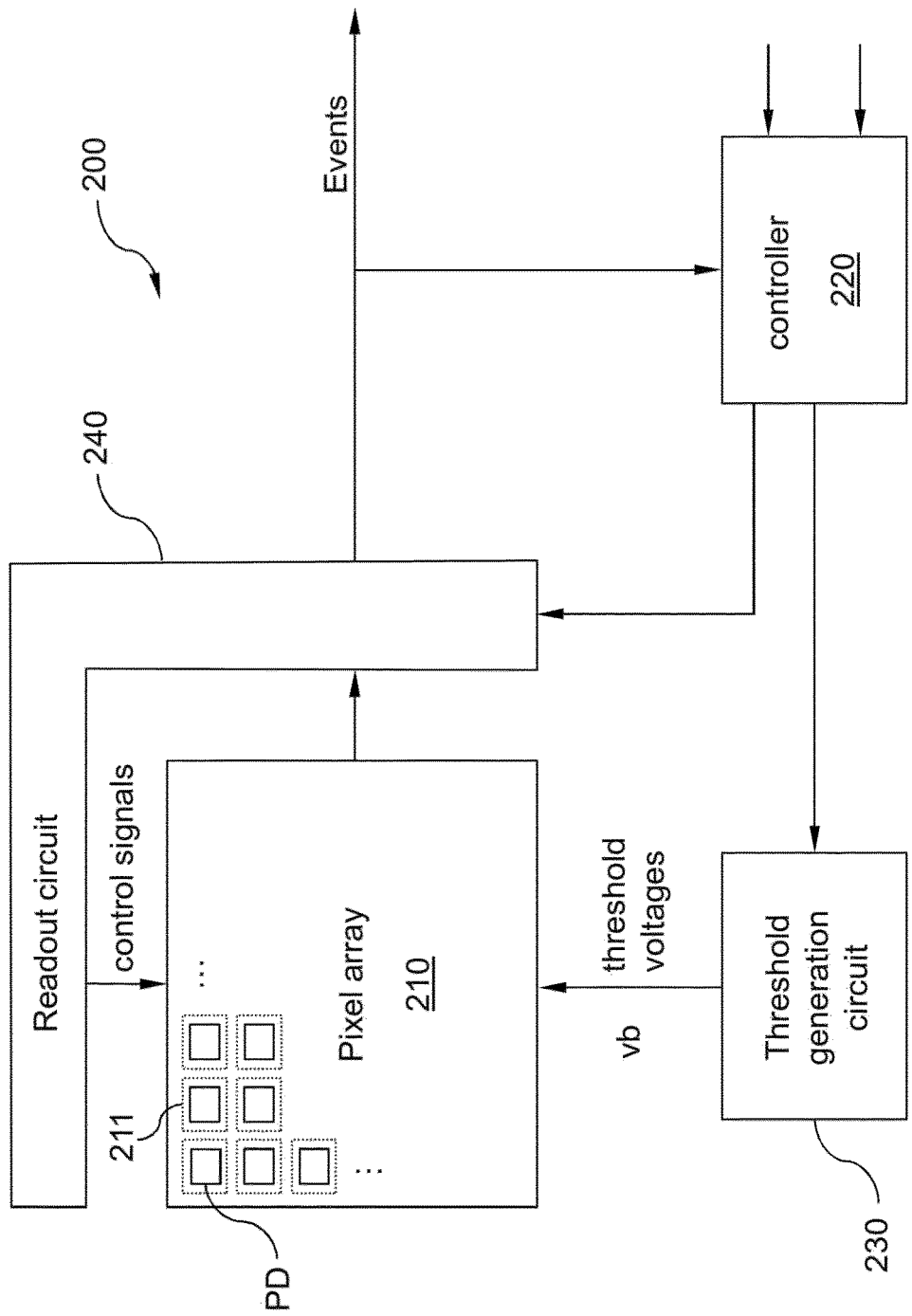
FIG. 1A is a simplified block diagram of a solid-state imaging device including a pixel array with photoreceptor modules for event detection according to an embodiment.

FIG. 1A is a block diagram of a solid-state imaging device 200 employing event based change detection. The solid-state imaging device 200 includes a pixel array 210 with one or more pixels 211, wherein each pixel 211 includes a photoelectric conversion element PD. The pixel array 210 may consist of one single pixel or may be a one-dimensional pixel array with the photoelectric conversion elements PD of all pixels arranged along a straight or meandering line (line sensor). In particular, the pixel array 210 may be a two-dimensional array, wherein the photoelectric conversion elements PDs of the pixels 211 may be arranged along straight or meandering rows and along straight or meandering lines.

The illustrated embodiment shows a two dimensional array of pixels 211, wherein the pixels 211 are arranged along straight rows and along straight columns running orthogonal the rows. Each pixel 211 converts incoming light into a signal indicating a change of the light intensity, e.g. an increase by at least an upper threshold amount and/or a decrease by at least a lower threshold amount.

A controller 220 performs a flow control of the processes in the pixel array 210. For example, the controller 220 may control a threshold generation circuit 230 that determines and supplies thresholds to individual pixels 211 in the pixel array 210. A readout circuit 240 provides control signals for addressing individual pixels 211 and outputs information about the position of such pixels 211 that indicate an event. Since the solid-state imaging device 200 employs event-based change detection, the readout circuit 240 may output a variable amount of data per time unit.

Figure 1B:
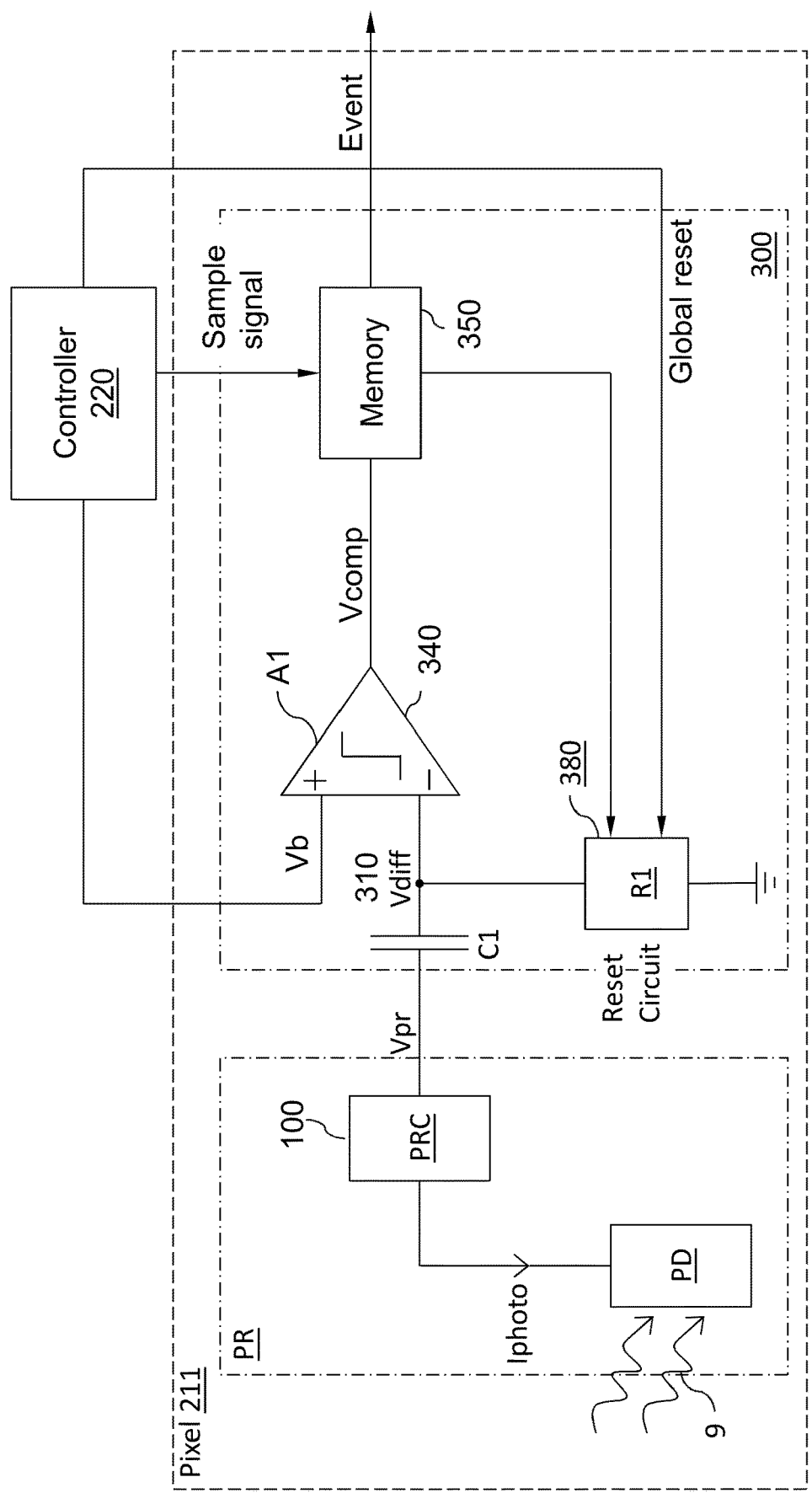
FIG. 1B is a simplified block diagram of the pixel array illustrated in FIG. 1A.

FIG. 1B shows details of the pixels 211 in FIG. 1A. Each pixel 211 includes a photoreceptor module PR and is assigned to a pixel back-end 300, wherein each complete pixel back-end 300 may be assigned to one single photoreceptor module PR. Alternatively, a pixel back-end 300 or parts thereof may be assigned to two or more photoreceptor modules PR, wherein the shared portion of the pixel back-end 300 may be sequentially connected to the assigned photoreceptor modules PR in a multiplexed manner.

The photoreceptor module PR includes a photoelectric conversion element PD, e.g. a photodiode or another type of photosensor. The photoelectric conversion element PD converts impinging light 9 into a photocurrent Iphoto through the photoelectric conversion element PD, wherein the amount of the photocurrent Iphoto is a function of the light intensity of the impinging light 9.

A photoreceptor circuit PRC converts the photocurrent Iphoto into a photoreceptor signal Vpr. The voltage of the photoreceptor signal Vpr is a function of the photocurrent Iphoto.

A memory capacitor 310 stores electric charge and holds a memory voltage which amount depends on a past photoreceptor signal Vpr. In particular, the memory capacitor 310 receives the photoreceptor signal Vpr such that a first electrode of the memory capacitor 310 carries a charge that is responsive to the photoreceptor signal Vpr and thus the light received by the photoelectric conversion element PD. A second electrode of the memory capacitor C1 is connected to the comparator node (inverting input) of a comparator circuit 340. Thus the voltage of the comparator node, Vdiff varies with changes in the photoreceptor signal Vpr.

The comparator circuit 340 compares the difference between the current photoreceptor signal Vpr and the past photoreceptor signal to a threshold. The comparator circuit 340 can be in each pixel back-end 300, or shared between a subset (for example a column) of pixels. According to an example each pixel 211 includes a pixel back-end 300 including a comparator circuit 340, such that the comparator circuit 340 is integral to the pixel 211 and each pixel has a dedicated comparator circuit 340.

A memory element 350 stores the comparator output in response to a sample signal from the controller 220. The memory element 350 may include a sampling circuit (for example a switch and a parasitic or explicit capacitor) and/or a digital memory circuit such as a latch or a flip-flop). In one embodiment, the memory element 350 may be a sampling circuit. The memory element 350 may be configured to store one, two or more binary bits.

An output signal of a reset circuit 380 may set the inverting input of the comparator circuit 340 to a predefined potential. The output signal of the reset circuit 380 may be controlled in response to the content of the memory element 350 and/or in response to a global reset signal received from the controller 220.

The solid-state imaging device 200 is operated as follows: A change in light intensity of incident radiation 9 translates into a change of the photoreceptor signal Vpr. At times designated by the controller 220, the comparator circuit 340 compares Vdiff at the inverting input (comparator node) to a threshold Vb applied on its non-inverting input. At the same time, the controller 220 operates the memory element 350 to store the comparator output signal Vcomp. The memory element 350 may be located in either the pixel circuit 211 or in the readout circuit 240 shown in FIG. 1A.

If the state of the stored comparator output signal indicates a change in light intensity AND the global reset signal GlobalReset (controlled by the controller 220) is active, the conditional reset circuit 380 outputs a reset output signal that resets Vdiff to a known level.

The memory element 350 may include information indicating a change of the light intensity detected by the pixel 211 by more than a threshold value.

The solid state imaging device 220 may output the addresses (where the address of a pixel 211 corresponds to its row and column number) of those pixels 211 where a light intensity change has been detected. A detected light intensity change at a given pixel is called an event. More specifically, the term 'event' means that the photoreceptor signal representing and being a function of light intensity of a pixel has changed by an amount greater than or equal to a threshold applied by the controller through the threshold generation circuit 230. To transmit an event, the address of the corresponding pixel 211 is transmitted along with data indicating whether the light intensity change was positive or negative. The data indicating whether the light intensity change was positive or negative may include one single bit.

To detect light intensity changes between current and previous instances in time, each pixel 211 stores a representation of the light intensity at the previous instance in time.

More concretely, each pixel 211 stores a voltage Vdiff representing the difference between the photoreceptor signal at the time of the last event registered at the concerned pixel 211 and the current photoreceptor signal at this pixel 211.

To detect events, Vdiff at the comparator node may be first compared to a first threshold to detect an increase in light intensity (ON-event), and the comparator output is sampled on a (explicit or parasitic) capacitor or stored in a flip-flop.

Then Vdiff at the comparator node is compared to a second threshold to detect a decrease in light intensity (OFF-event) and the comparator output is sampled on a (explicit or parasitic) capacitor or stored in a flip-flop.

The global reset signal is sent to all pixels 211, and in each pixel 211 this global reset signal is logically ANDed with the sampled comparator outputs to reset only those pixels where an event has been detected. Then the sampled comparator output voltages are read out, and the corresponding pixel addresses sent to a data receiving device.

Figure 2:
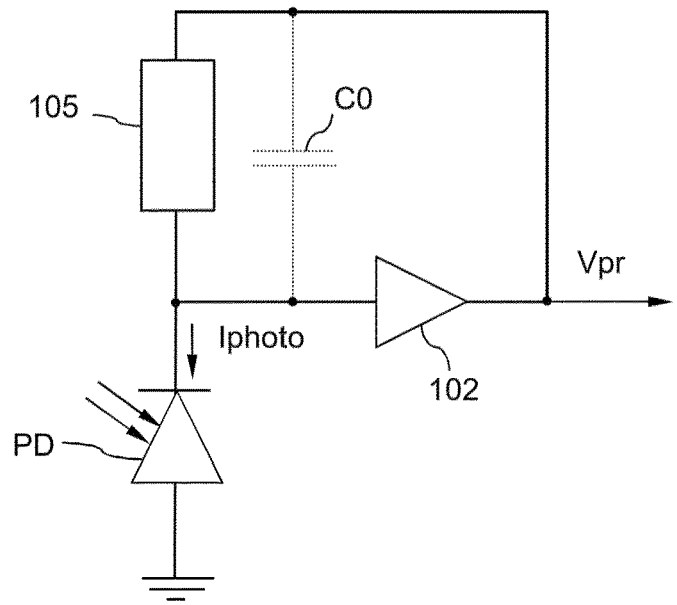
FIG. 2 is a simplified circuit diagram of a photoreceptor module according to a comparative example for discussing background helpful for the understanding of the embodiments.

FIG. 2 shows a photoreceptor module PR with a photodiode as photoelectric conversion element PD and with a photoreceptor circuit PRC including a feedback path. The photoreceptor circuit PRC includes an inverting amplifier 102 and a circuit element 105 in the feedback path between an output of the inverting amplifier 102 and the input of the inverting amplifier 102. The photoreceptor circuit PRC may have a logarithmic current-to-voltage (voltage-to-current) relation and may ensure that the voltage across the photoelectric conversion element PD remains almost constant.

A capacitance C0 effective between the output and the input of the inverting amplifier 102 affects both the pixel latency and the signal-to-noise ratio. The capacitance C0 may include parasitic capacitances. For example, conductor paths and circuit-internal capacitances of the inverting amplifier 102 may contribute to the capacitance C0.

Figure 3:
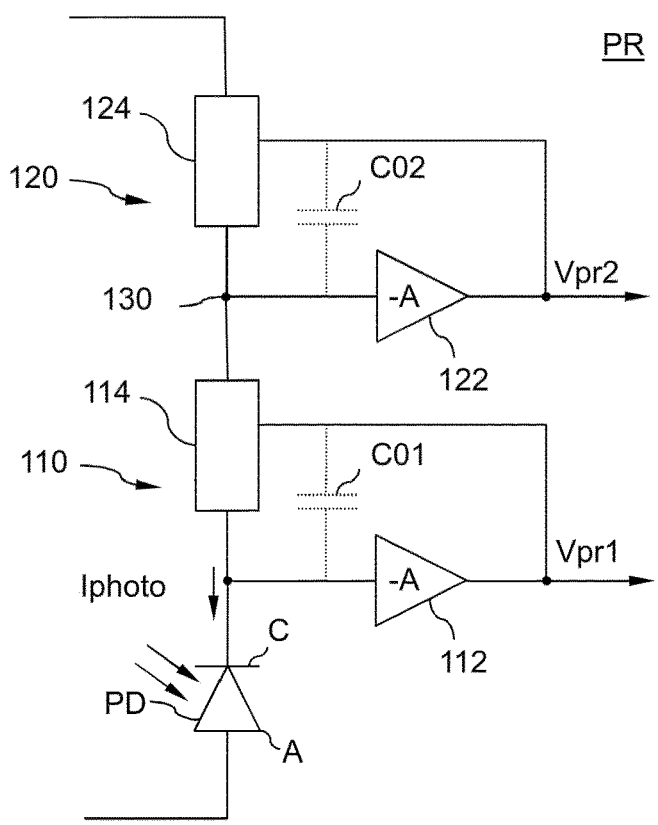
FIG. 3 is a simplified circuit diagram of a photoreceptor module outputting two different photoreceptor signals according to an embodiment.

According to FIG. 3 a photoreceptor module PR according to the embodiments of the present disclosure includes a photoelectric conversion element PD, a first amplifier circuit 110 and a second amplifier circuit 120.

The first amplifier circuit 110 includes a first amplifier portion 112 and a first feedback portion 114. The first amplifier portion 112 may include or consist of an inverting amplifier element, e.g. an n-channel MOSFET (metal oxide semiconductor field effect transistor). Alternatively, the first amplifier portion 112 may include an amplifier circuit with more than one transistor. In particular, the first amplifier portion 112 may be configured as common source amplifier circuit.

An output of the first amplifier portion 112 supplies a first photoreceptor signal Vpr1 and feeds back to the input of the first amplifier portion 112 through the first feedback portion 114. The first feedback portion 114 may include or consist of an amplifier element, e.g. an n-channel MOSFET in source-follower configuration. Alternatively, the first feedback portion 114 may include a p-channel MOSFET with fixed gate bias or a feedback circuit with more than one element.

The first amplifier portion 112 and the first feedback portion 114 define a predetermined current-to-voltage transfer characteristic of the first amplifier circuit 110. According to an example, the predetermined current-to-voltage transfer characteristic may be a logarithmic current-to-voltage transfer characteristic.

The second amplifier circuit 120 includes a second amplifier portion 122 and a second feedback portion 124. The second amplifier portion 122 may include or consist of an inverting amplifier element, e.g. an n-channel MOSFET. Alternatively, the second amplifier portion 122 may include an amplifier circuit with more than one transistor. In particular, the second amplifier portion 122 may be configured as common source amplifier.

An output of the second amplifier portion 122 supplies a second photoreceptor signal Vpr2 and is fed back to the input of the second amplifier portion 122 through the second feedback portion 124. The second feedback portion 124 may include or consist of an amplifier element, e.g. an n-channel MOSFET in source-follower configuration. Alternatively, the second feedback portion 124 may include a p-channel MOSFET with fixed gate bias or a feedback circuit with more than one element.

The second amplifier portion 122 and the second feedback portion 124 define a predetermined current-to-voltage transfer characteristic of the second amplifier circuit 120. According to an example, the predetermined current-to-voltage transfer characteristic may be a logarithmic current-to-voltage transfer characteristic.

The circuit structures of the first and second amplifier portions 112, 122 may be the same and may include the same number of electronic elements. Alternatively, the first and second amplifier portions 112, 122 may have different circuit structures and/or may differ in the number of electronic elements. Accordingly, the circuit structures of the first and second feedback portions 114, 124 may be the same and may include the same number of electronic elements. Alternatively, the first and second feedback portions 114, 124 may have different circuit structures and/or may differ in the number of electronic elements.

Each of the first and second feedback portions 114, 124 includes a controlled path, wherein a current through the controlled path is controlled in response to the respective feedback signal. The controlled path of the second feedback portion 124 and the controlled path of the first feedback portion 114 are electrically connected in series such that the same current flows through the controlled path of the second feedback portion 124 and the controlled path of the first feedback portion 124.

An input of the first amplifier portion 112 and a cathode C of the photoelectric conversion element PD may be electrically connected. For example, the controlled path of the second feedback portion 124, the controlled path of the first feedback portion 114 and the photoelectric conversion element PD may be electrically connected in series such that the same photocurrent Iphoto flows through the controlled path of the second feedback portion 124, the controlled path of the first feedback portion 124 and the photoelectric conversion element PD.

An output of the first amplifier portion 112 and an input of the first feedback portion 114 are electrically connected and an output of the second amplifier portion 122 and an input of the second feedback portion 124 are electrically connected.

In particular, an input of the second amplifier portion 122 and a network node 130 between the controlled path of the first feedback circuit 112 and the controlled path of the second feedback circuit are electrically connected, e.g. through a direct low-resistive conductor line.

An output of the first amplifier circuit 110 may be electrically connected to a pixel back-end and an output of the second amplifier circuit 120 may be electrically connected to a pixel back-end. In other words, the first photoreceptor signal Vpr1 is transmitted to a pixel back-end and the second photoreceptor signal Vpr2 is transmitted to a pixel back-end. The first and second photoreceptor signals Vpr1, Vpr2 may be transmitted sequentially to the same pixel back-end or may be transmitted simultaneously to two different pixel back-ends.

Since different capacitances C01, C02 may be effective for the first photoreceptor signal Vpr1 output by the first amplifier circuit 110 and for the second photoreceptor signal Vpr2 output by the second amplifier circuit 120, by appropriately selecting and/or combining the evaluation and/or signal processing of the first photoreceptor signal Vpr1 and the second photoreceptor signal Vpr2, the photoreceptor module PR may provide photoreceptor signals with low SNR and/or with low pixel latency.

For example, a first capacitance C01 effective between an output and an input of the first amplifier circuit 110 and a second capacitance C02 effective between an output and an input of the second amplifier circuit 120 differ from each other.

The input of the first amplifier circuit 110 may be the input of the first amplifier portion 112. The output of the first amplifier circuit 110 may be the output of the first amplifier portion 112. The input of the second amplifier circuit 120 may be the input of the second amplifier portion 122. The output of the second amplifier circuit 120 may be the output of the second amplifier portion 122.

One of the first and second capacitances C01, C02 may be at most 95%, at most 90%, e.g. at most 50% or at most 10% of the greater one of the two capacitances.

The first capacitance C01 may consist or mainly consist of parasitic capacitances. For example, the first amplifier circuit 110 may include a common source amplifier, wherein the intrinsic gate-to-drain capacitance of the common source amplifier forms the first capacitance C01 or at least a main portion or a significant portion of the first capacitance C01. Alternatively or in addition, a capacitance effective between a first conductive path connected to the input of the first amplifier circuit 110 and a second conductive path connected to the output of the first amplifier circuit 110 may contribute to the first capacitance C01. Further in addition or alternatively, additional discrete elements, structures and/or discrete metal-insulator-metal capacitive structures may form or may contribute to the first capacitance C01.

Accordingly, the second capacitance C02 may consist or mainly consist of parasitic capacitances. For example, the second amplifier circuit 120 may include a common source amplifier, wherein the intrinsic gate-to-drain capacitance of the common source amplifier forms the second capacitance C02 or at least a portion of the second capacitance C02. Alternatively or in addition, a capacitance effective between a first conductive path connected to the input of the second amplifier circuit 120 and a second conductive path connected to the output of the second amplifier circuit 120 may contribute to the second capacitance C02. Further in addition or alternatively, additional discrete elements and/or discrete metal-insulator-metal capacitive structures electrically connected in parallel between the input and the output of the second amplifier circuit 120 may form or may contribute to the second capacitance C02.

Compared to solutions providing first photoreceptor module for high SNR and including first photoelectric conversion elements and second photoreceptor modules for low pixel latency including second photoelectric conversion elements, both photoreceptor signals Vpr1, Vpr2 of the embodiments are derived from the same photoelectric conversion element PD and the same photoconversion area.

Figure 4A:
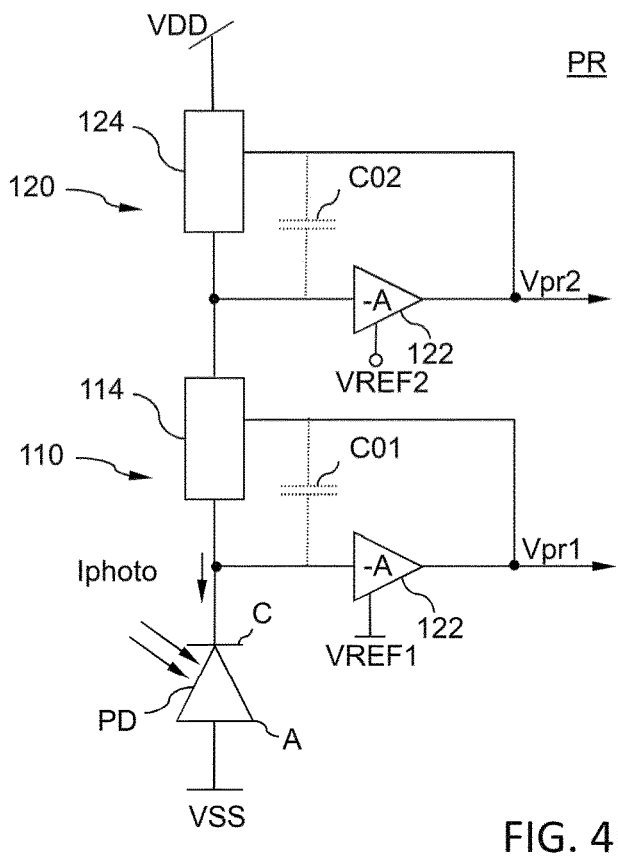
FIGS. 4A-4C are simplified circuit diagrams of photoreceptor modules with two different photoreceptor signals according to further embodiments.

FIG. 4A refers to a photoreceptor module PR with the controlled path of the second feedback circuit 124, the controlled path of the first feedback circuit 114 and the photoelectric conversion element PD electrically connected in series in this order between a high supply potential VDD and a low supply potential VSS. A first reference voltage VREF1 for the first amplifier circuit 110 with the first amplifier portion 112 may be equal to the low supply potential VSS.

The second amplifier circuit 120 may be configured such that an input voltage of the second amplifier portion 122 is higher, in particular permanently higher, than an input voltage of the first amplifier portion 112 to ensure that the controlled path of the first feedback circuit 114, which may include a drain-to-source path of an MOSFET, safely remains in saturation.

For example, the second reference voltage VREF2 for the second amplifier circuit 120 with the second amplifier portion 122 may be a potential higher than the low supply potential VSS and lower than the high supply potential VDD.

Since the photocurrent Iphoto raises the potential at the node between the controlled path of the second feedback circuit 124 and the controlled path of the first feedback circuit 114, a second reference potential VREF2 higher than the first reference potential VREF1 may reduce the effective voltage at the input of the second amplifier portion 122.

Figure 4B:
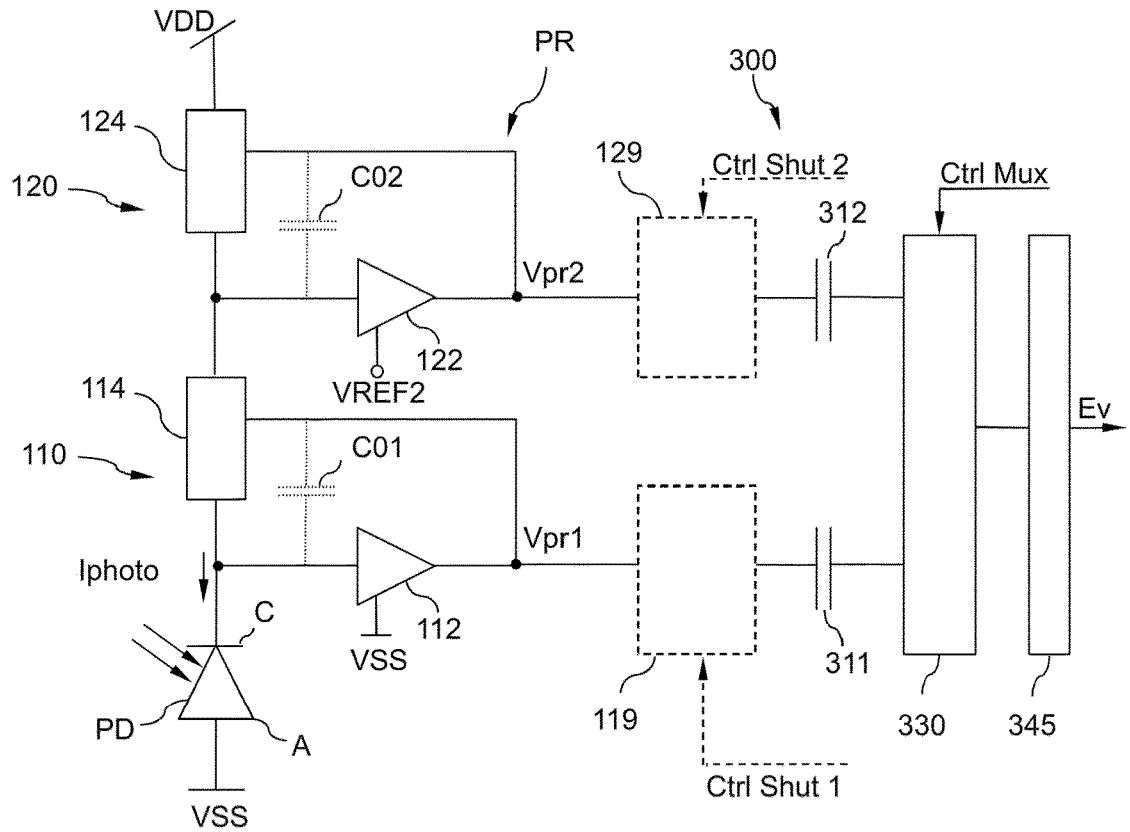

In FIG. 4B the output of the first amplifier circuit 110 of the photoreceptor module PR is electrically connected with a first electrode of a first memory capacitor 311 of the pixel back-end 300. The electrical connection may be direct and without intervening elements. Alternatively, as indicated by the block with the dashed outline, one or more elements facilitating at least temporary signal transmission may be electrically connected between the output of the first amplifier circuit 110 and the first electrode of the first memory capacitor 311. For example, a first sample/buffer circuit 119 may electrically connect the output of the first amplifier circuit 110 to the first electrode of the first memory capacitor 311.

Accordingly, the output of the second amplifier circuit 120 is electrically connected with a first electrode of a second memory capacitor 312 of the pixel back-end 300, wherein the electrical connection may be a direct one and without intervening elements, or may include one or more elements facilitating at least temporary signal transmission. For example, a second sample/buffer circuit 129 may be electrically connected between the output of the second amplifier circuit 120 and the first electrode of the second memory capacitor 312.

The sample/buffer circuits 119, 129 may be buffer circuits without control inputs to adapt the photoreceptor signals Vpr1, Vpr2 to the memory capacitors 311, 312. Alternatively or in addition, the sample/buffer circuits 119, 129 may include hold circuits controllable through a common control signal or through two different control signals CtrlShut1, CtrlShut2 as illustrated.

The sample/buffer circuits 119, 129 may sample the first and second photoreceptor signals Vpr1, Vpr2 to "freeze" the first and second photoreceptor signals Vpr1, Vpr2 at a predetermined point in time.

For example, in response to a control signal CtrlShut from the controller 220 of FIGS. 1A and 1B, all pixels of a pixel array may be sampled at the same point in time by using a global shutter signal to globally sample the photoreceptor signals of all pixels at the same moment to avoid motion artifacts. The sample/buffer circuits 119, 129 may include a parasitic or explicit sampling capacitor and a switch that during an illumination period connects the sampling capacitor with the respective photoreceptor signal Vpr1, Vpr2 and that disconnects the sampling capacitor from the respective photoreceptor signal Vpr1, Vpr2 at least for a time period between the illumination period and the completion of an evaluation of the voltage across the respective memory capacitor 311, 312.

By providing one memory capacitor 311, 312 for each single one of the photoreceptor signals Vpr1, Vpr2 the photoreceptor module according to the embodiment may facilitate a contemporaneous capture and, if applicable, a contemporaneous or a sequential evaluation of both photoreceptor signals Vpr1, Vpr2.

The pixel back-end 300 may further include a multiplexer circuit 330. A second electrode of the first memory capacitor 311 is electrically connected to a first input of the multiplexer circuit 330. A second electrode of the second memory capacitor 312 is electrically connected to a second input of the multiplexer circuit 330. A control signal CtrlMux may control the multiplexer circuit 330 in response to changing states of a process-oriented or time-oriented sequential control executed in the controller 220 of FIGS. 1A, 1B. In response to the control signal CtrlMux, the voltage across the selected one of the memory capacitors 312, 311 is evaluated by a shared portion of the pixel back-end 300.

The multiplexer circuit 330 facilitates the alternative selection of one of the two photoreceptor signals Vpr1, Vpr2 or the sequential evaluation of both photoreceptor signals Vpr1, Vpr2 for event detection at low additional circuit complexity according to a sequential control executed by the controller 220 of FIGS. 1A-1B.

Figure 4C:
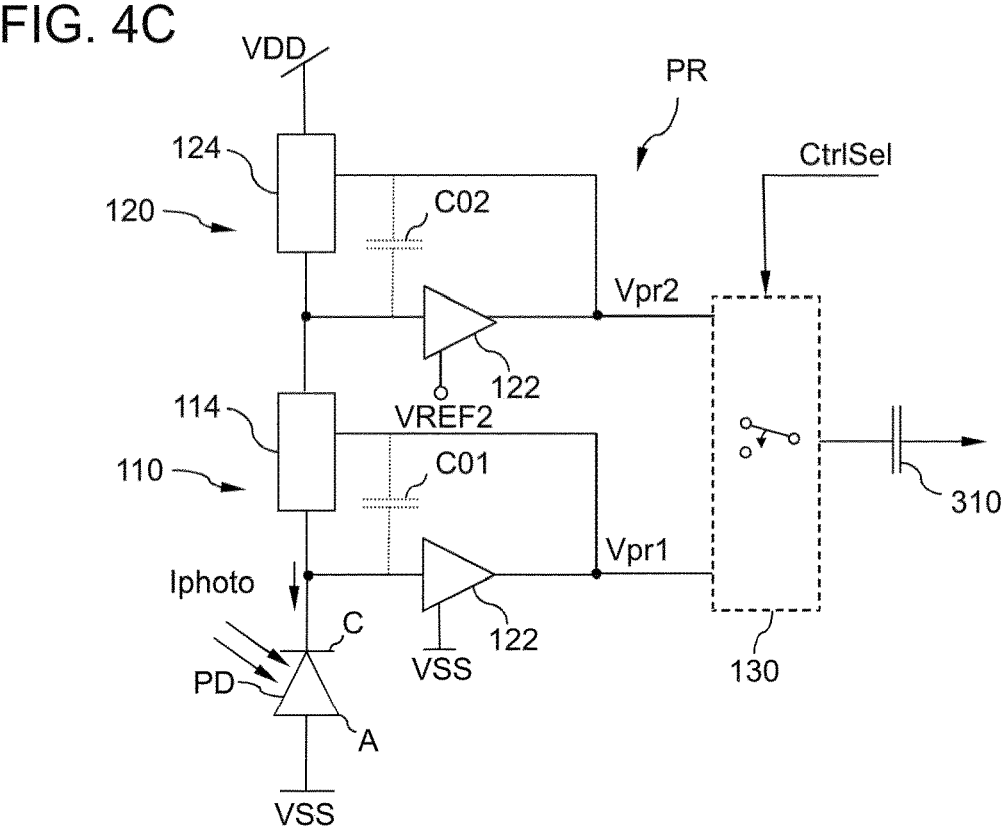

In FIG. 4C both photoreceptor signals Vpr1, Vpr2 of the photoreceptor module PR are assigned to one single common memory capacitor 310. The photoreceptor module PR includes one selector circuit 131 controllable through a selection signal CtrlSel. The selector circuit 131 may route either the first photoreceptor signal Vpr1 or the second photoreceptor signal Vpr2 to a first electrode of the common memory capacitor 139. The selection signal CtrlSel may be configurable by hardware elements on manufacturing or assembly level, e.g. through a fuse. Alternatively, the selection signal CtrlSel may be provided by the controller 220 shown in FIGS. 1A, 1B in response to changing states of a process-oriented or time-oriented sequential control.

The selector circuit 131 may facilitate a sequential evaluation of the first and second photoreceptor signals Vpr1, Vpr2 without significantly increasing the number of electronic circuits. Alternatively or in addition, the selector circuit 131 may facilitate a controlled selection of one of the amplifier circuits 110, 120 according to an operation mode of the pixel array, wherein a first operation mode may utilize the better temporal resolution of the amplifier circuit 110, 120 with the lower capacitance C01, C02 and wherein a second operation mode may utilize the low SNR of the amplifier circuit 110, 120 with the higher capacitance C01, C02.

Figure 5:
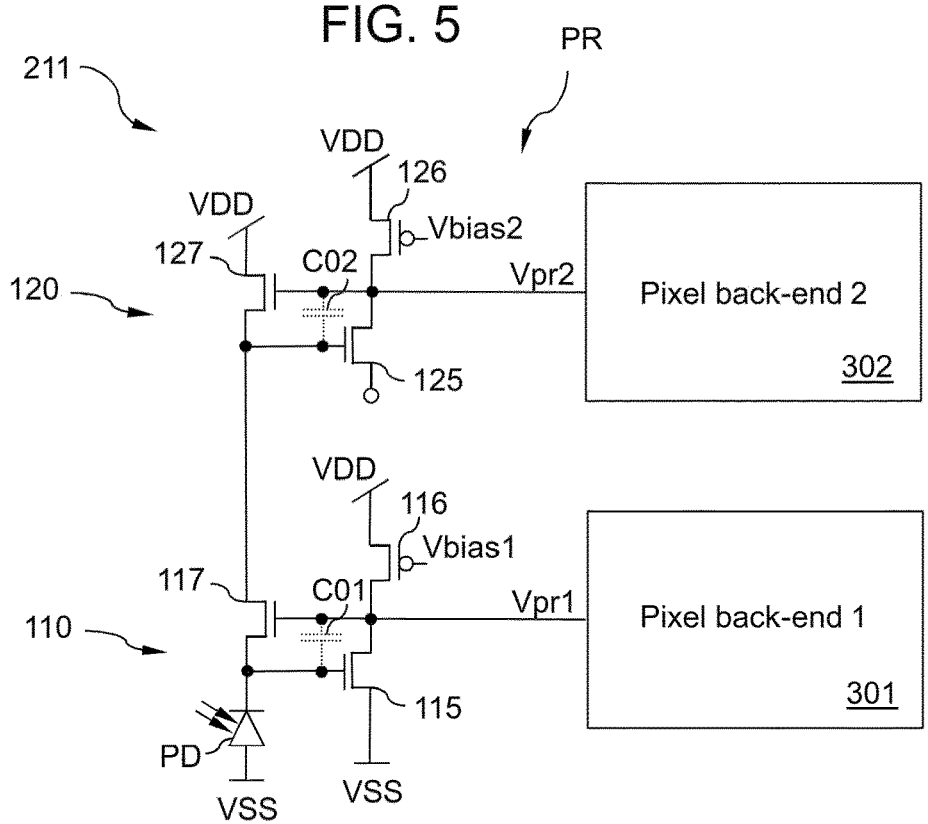
FIG. 5 is a schematic circuit diagram of a photoreceptor module according to an embodiment using two amplifier circuits for generating two different photoreceptor signals.

FIG. 5 shows details of a pixel 211 with one photoreceptor module PR and two pixel back-ends 301, 302, wherein n-channel MOSFETs are used as feedback portions and inverting common source amplifiers are used as amplifier portions of the first and second amplifier circuits 110, 120 of the photoreceptor module PR.

The first amplifier circuit 110 includes a first n-channel feedback MOSFET 117. A source of the first feedback MOSFET 117 is connected to a cathode C of the photoelectric conversion element PD. An anode A of the photoelectric conversion element PD is electrically connected to a low supply voltage VSS. The first amplifier circuit 110 further includes a first common source amplifier including a first n-channel amplifier MOSET 115 and a first load element. The source of the first amplifier MOSFET 115 is electrically connected to the low supply potential VSS. The first load element is electrically connected between the high supply potential VDD and the drain of the first amplifier MOSFET 115. The first load element may include the controlled path of a first p-channel load MOSFET 116 with the gate electrically connected to a first bias potential Vbias1. The first bias potential Vbias1 may be fixed.

The gate of the first amplifier MOSFET 115 and the Cathode C of the photoelectric conversion element PD may be electrically connected with each other. A first output node electrically connecting the gate of the first feedback MOSFET 117, the drain of the first amplifier MOSFET 115 and a first electrode of the first load element, e.g. the first load MOSFET 116, supplies the first photoreceptor signal Vpr1 which is output to a first pixel back-end 301.

The first amplifier circuit 110 may be a logarithmic amplifier with a substantially logarithmic response, wherein the voltage of the first photoreceptor signal Vpr1 is linearly related to the logarithm of the photocurrent Iphoto.

Accordingly, the second amplifier circuit 120 includes an n-channel second feedback MOSFET 127. A source of the second feedback MOSFET 127 may be directly electrically connected to the drain of the first feedback MOSFET 117 and a drain of the second feedback MOSFET 127 is electrically connected to the high supply voltage VDD such that the controlled current path of the second feedback MOSFET 127, the controlled current path of the first feedback MOSFET 117 and the photoelectric conversion element PD are electrically connected in series between the high voltage supply VDD and the low voltage supply VSS in this order.

The second amplifier circuit 120 further includes a second common source amplifier including an n-channel second amplifier MOSET 125 and a second load element. The source of the second amplifier MOSFET 125 is electrically connected to a second reference potential VREF2 that may be equal to the low supply potential VSS or that may a potential between the high supply potential VDD and the low supply potential VSS.

The second load element is electrically connected between the high supply potential VDD and the drain of the second amplifier MOSFET 125. The second load element may include the controlled path of a second p-channel load MOSFET 126 with the gate electrically connected to a second bias potential Vbias2, which may be equal to the first bias potential Vbias1 or which may differ from the first bias potential Vbias1. The second bias potential Vbias2 may be fixed.

The gate of the second amplifier MOSFET 125 is electrically connected with the source of the second feedback MOSFET 127. A second output node electrically connecting the gate of the second feedback MOSFET 127, the drain of the second amplifier MOSFET 125 and a first electrode of the second load element, e.g. the second load MOSFET 126, supplies the second photoreceptor signal Vpr2 which is output to a second pixel back-end 302.

The second amplifier circuit 120 may also have a substantially logarithmic response, wherein the voltage of the second photoreceptor signal Vpr2 is linearly related to the logarithm of the photocurrent Iphoto.

The first photoreceptor signal Vpr1 is transmitted to the first pixel back-end 301 receiving the first photoreceptor signal Vpr1. The second photoreceptor signal Vpr2 is transmitted to a second pixel back-end 302 receiving the second photoreceptor signal Vpr2.

A first capacitance C01 is effective between the output node of the first amplifier circuit 110 and the gate of the first amplifier MOSFET 115. A second capacitance C02 is effective between the output node of the second amplifier circuit 120 and the gate of the second amplifier MOSFET 125. For example, the first capacitance C01 may be at most 95%, at most 90%, at most 50% or at most 10% of the second capacitance C02. According to another example, the second capacitance C02 may be at most 95%, at most 90%, at most 50% or at most 10% of the first capacitance C01.

To ensure that the first feedback MOSFET 117 safely remains in saturation, the second amplifier circuit 120 is configured such that the voltage at the input of the second amplifier MOSFET 125 is kept slightly higher than the voltage at the input of the first amplifier MOSFET 115.

For example, the second reference voltage VREF2 for the second amplifier MOSFET 125 may be set to an electric potential sufficiently high to ensure proper operation of the first feedback MOSFET 117. Alternatively, a threshold voltage of the second amplifier MOSFET 125 may be set higher than a threshold voltage of the first amplifier MOSFET 115 to a degree that ensures proper operation of the first feedback MOSFET 117. Alternatively, the second bias potential Vbias2 may be lower than the first bias potential Vbias1 to a sufficient degree such that a higher drain current through the second amplifier MOSFET 125 results in a sufficiently high gate-to-source voltage at the input of the second amplifier MOSFET 125 to ensure proper operation of the first feedback MOSFET 117. Two or more of the mentioned features may be combined in a way that only the combination ensures proper operation of the first feedback MOSFET 117.

Figure 6:
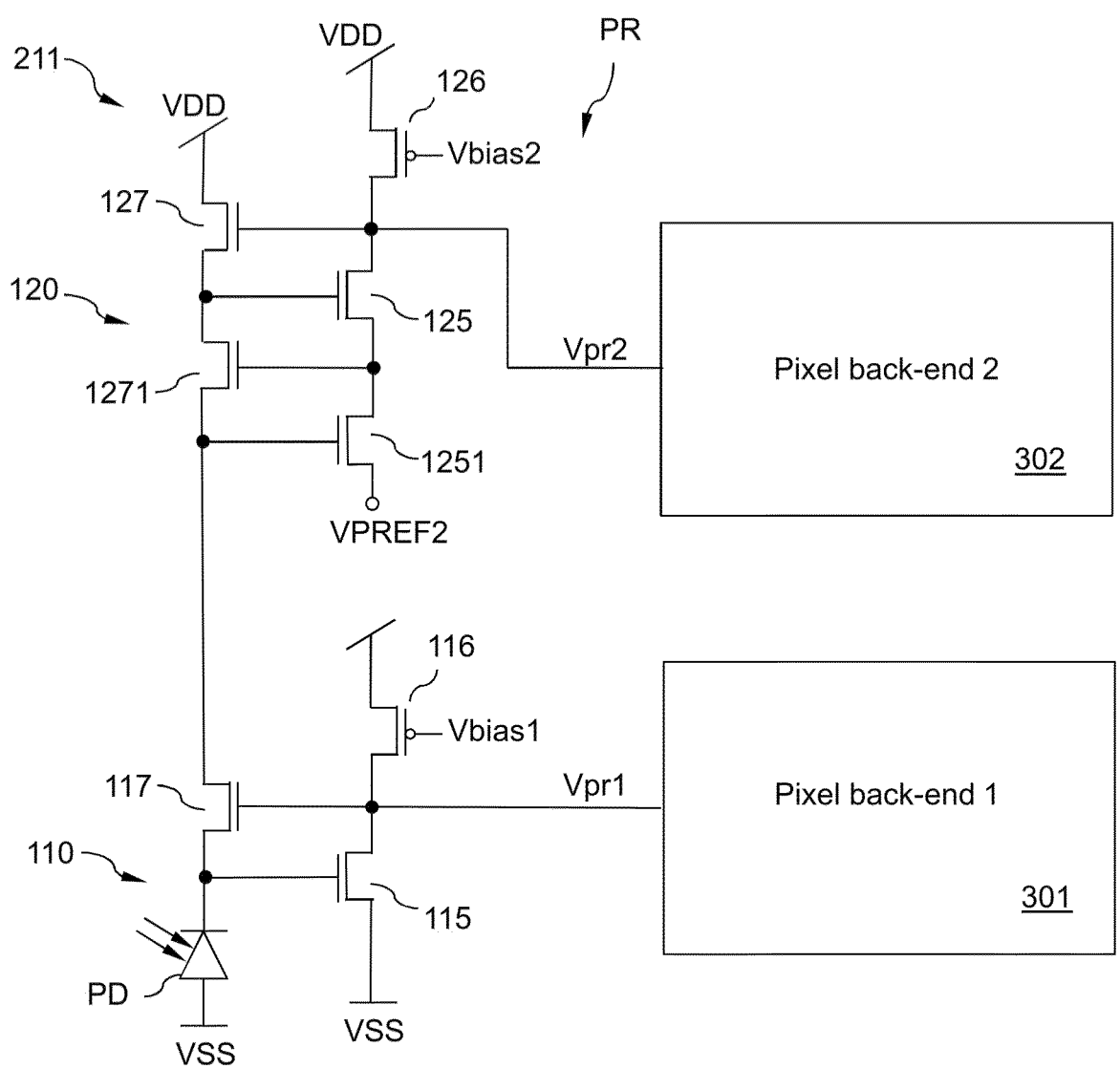
FIG. 6 is a schematic circuit diagram of a photoreceptor module according to an embodiment using amplifier circuits with different gain for generating two different photoreceptor signals.

FIG. 6 refers to an embodiment with the second amplifier circuit 120 having a higher gain than the first amplifier circuit 110.

The first amplifier circuit 110 may have the circuit structure as described with reference to FIG. 5. The second amplifier circuit 120 may include a main stage with a second n-channel amplifier MOSET 125, a second load element, e.g. a p-channel load MOSFET 126 electrically connected between the high supply potential VDD and the drain of the second amplifier MOSFET 125 and with an n-channel feedback MOSFET 127, which drain is electrically connected to the high supply potential VDD and which gate is electrically connected to the drain of the amplifier MOSFET 125 as described with reference to FIG. 5.

The second amplifier circuit 120 further includes a pre-stage with an n-channel pre-stage feedback MOSFET 1271 and an n-channel pre-stage amplifier MOSFET 1251. A drain of the pre-stage amplifier MOSFET 1251 is electrically connected to the source of the second amplifier MOSFET 125. A source of the pre-stage amplifier MOSFET 1251 is electrically connected to the second reference potential VREF2 which may be equal to the low supply potential VSS or which may be a potential between the high supply potential VDD and the low supply potential VSS.

A gate of the pre-stage amplifier MOSFET 1251 is electrically connected to the drain of the first feedback MOSFET 117 and to the source of the pre-stage feedback MOSFET 1271.

A gate of the pre-stage feedback MOSFET 1271 is electrically connected to the drain of the pre-stage amplifier MOSFET 1251 and to the source of the second amplifier MOSFET 125.

A gate of the second amplifier MOSFET 125 is electrically connected to the drain of the pre-stage feedback MOSFET 1271 and to the source of the second feedback MOSFET 127.

The pre-stage increases the gain of the second amplifier circuit 120.

Figure 7:
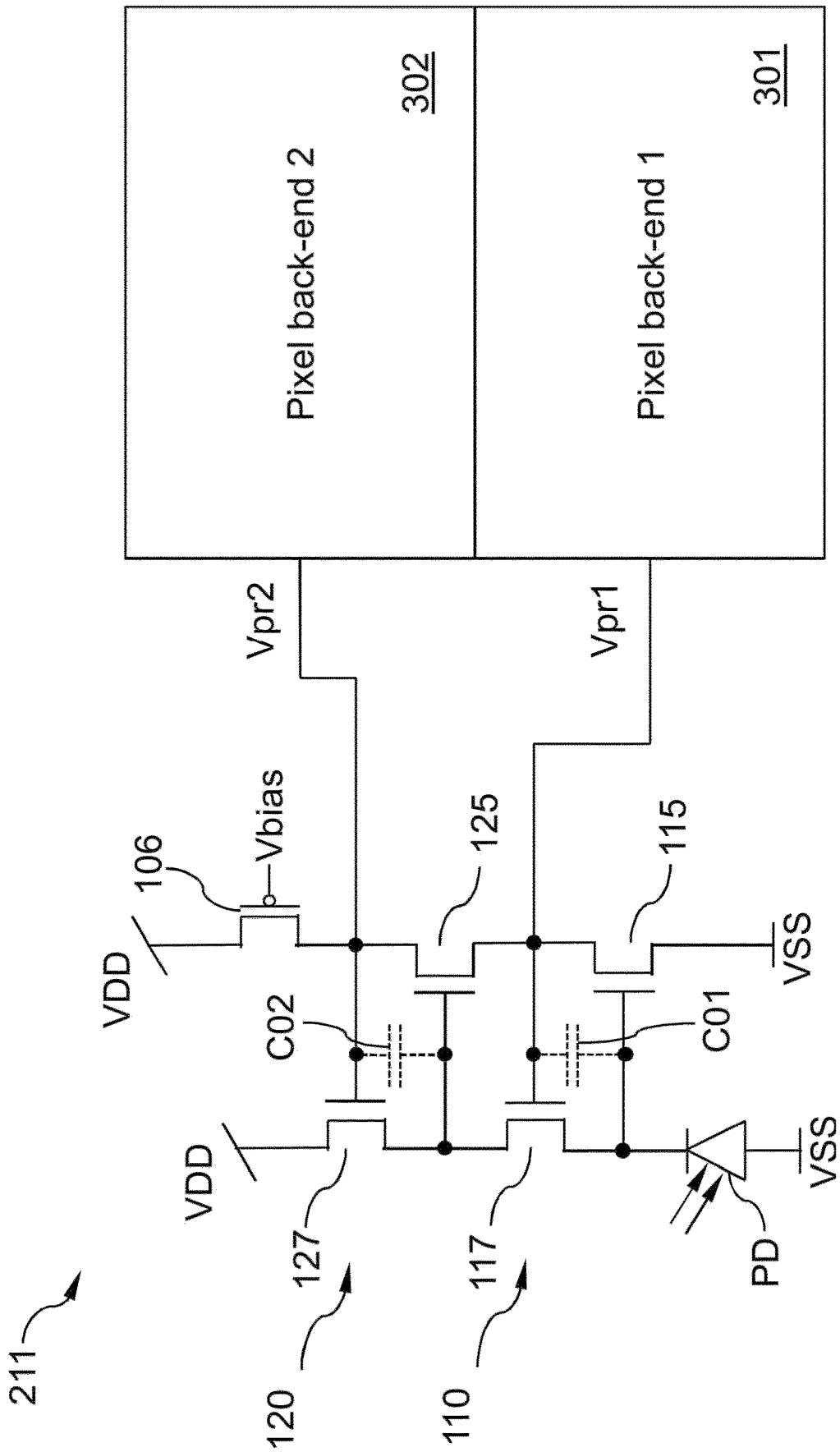
FIG. 7 is a schematic circuit diagram of a photoreceptor module according to an embodiment using different stages of a multistage amplifier circuit for generating two different photoreceptor signals.

In FIG. 7 the first amplifier circuit 110 and the second amplifier circuit 120 form parts of a multiple transistor feedback logarithmic amplifier circuit (LAC).

In particular, controlled paths of the first amplifier portion 112 and the second amplifier portion 212 are electrically connected in series.

In particular, the source of the second amplifier MOSFET 125 is electrically connected to the drain of the first amplifier MOSFET 115 such that a common load element, e.g. a shared p-channel load MOSFET 106 with biased gate, the controlled path of the second amplifier MOSFET 125 and the controlled path of the first amplifier MOSFET 115 are electrically connected in series between the high supply potential VDD and the low supply potential VSS in this order.

By designing the multiple transistor feedback LAC with suitable capacitances effective between the MOSFETs, the first photoreceptor signal Vpr1 may show low latency, whereas for the second photoreceptor signal Vpr2 the gain and/or the SNR may be higher.

Figure 8:
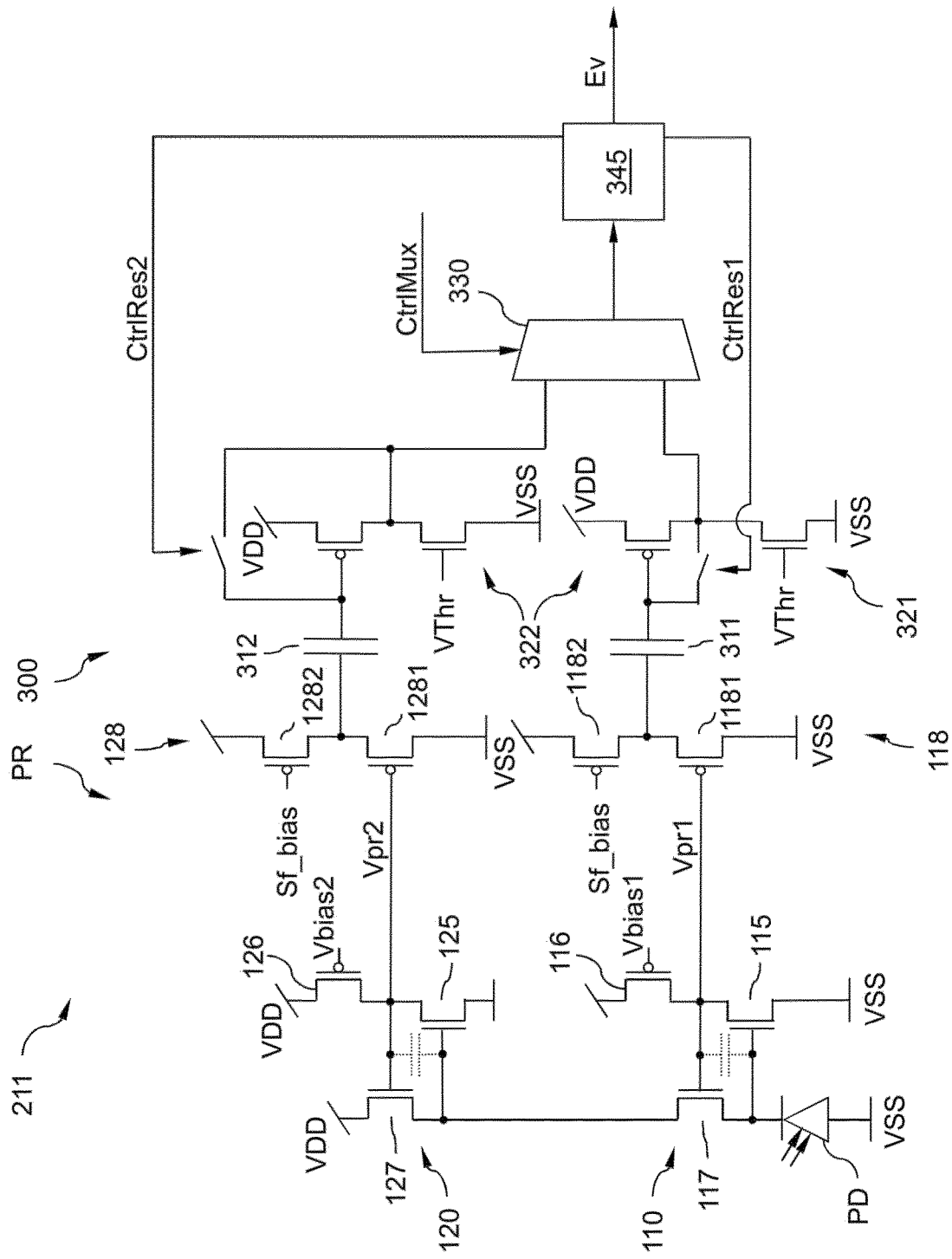
FIG. 8 is a simplified circuit/block diagram of a pixel circuit with one pixel back-end partially shared between two different photoreceptor signals of a photoreceptor module.

The pixel 211 in FIG. 8 includes a photoreceptor module PR with the first and second amplifier circuits 110, 120 including output buffer circuits 118, 128 between the logarithmic amplifiers and the respective memory capacitors 311, 312.

The output buffer circuits 118, 128 may be source follower circuits that isolate the front-end from voltage transients during pixel reset. The source follower circuits may also facilitate low-pass filtering of the photoreceptor signals and may thus reduce the integrated noise.

In the illustrated embodiment, the first output buffer circuit 118 includes a buffer load element 1182 between the high voltage supply VDD and a buffer output node, and a p-channel buffer MOSFET 1181 with the drain connected to the output node and the source connected to the low supply potential VSS. The first photoreceptor signal Vpr1 is input at the gate of the buffer MO SET 1181. The output node is connected to the first electrode of the first memory capacitor 311. The buffer load element 1182 may include a p-channel load MOSFET with fixed gate input. The second output buffer circuit 128 may have the same circuit structure.

The pixel back end 300 includes a multiplexer circuit 330. A first input of the multiplexer circuit 330 is electrically connected to the second electrode of the first memory capacitor 311. A first input of the multiplexer circuit 330 is electrically connected to the second electrode of the second memory capacitor 311. An output of the multiplexer circuit 330 is electrically connected to an event detector circuit 345 that may include a comparator comparing a current input voltage with a previously stored voltage. In response to a control signal CtrlMux applied to a control input of the multiplexer circuit 330, the multiplexer circuit 330 routes the first or the second photoreceptor signal Vpr1, Vpr2 to the event detector circuit 345 of the pixel back-end 300.

In response to a first reset signal CtrlRes1 a first reset/initialization circuit 321 sets the potential at the second electrode of the first memory capacitor 311 to a predefined level. In response to a second reset signal CtrlRes2 a second reset/initialization circuit 322 sets the potential at the second electrode of the second memory capacitor 312 to a predefined level.

Figure 9:
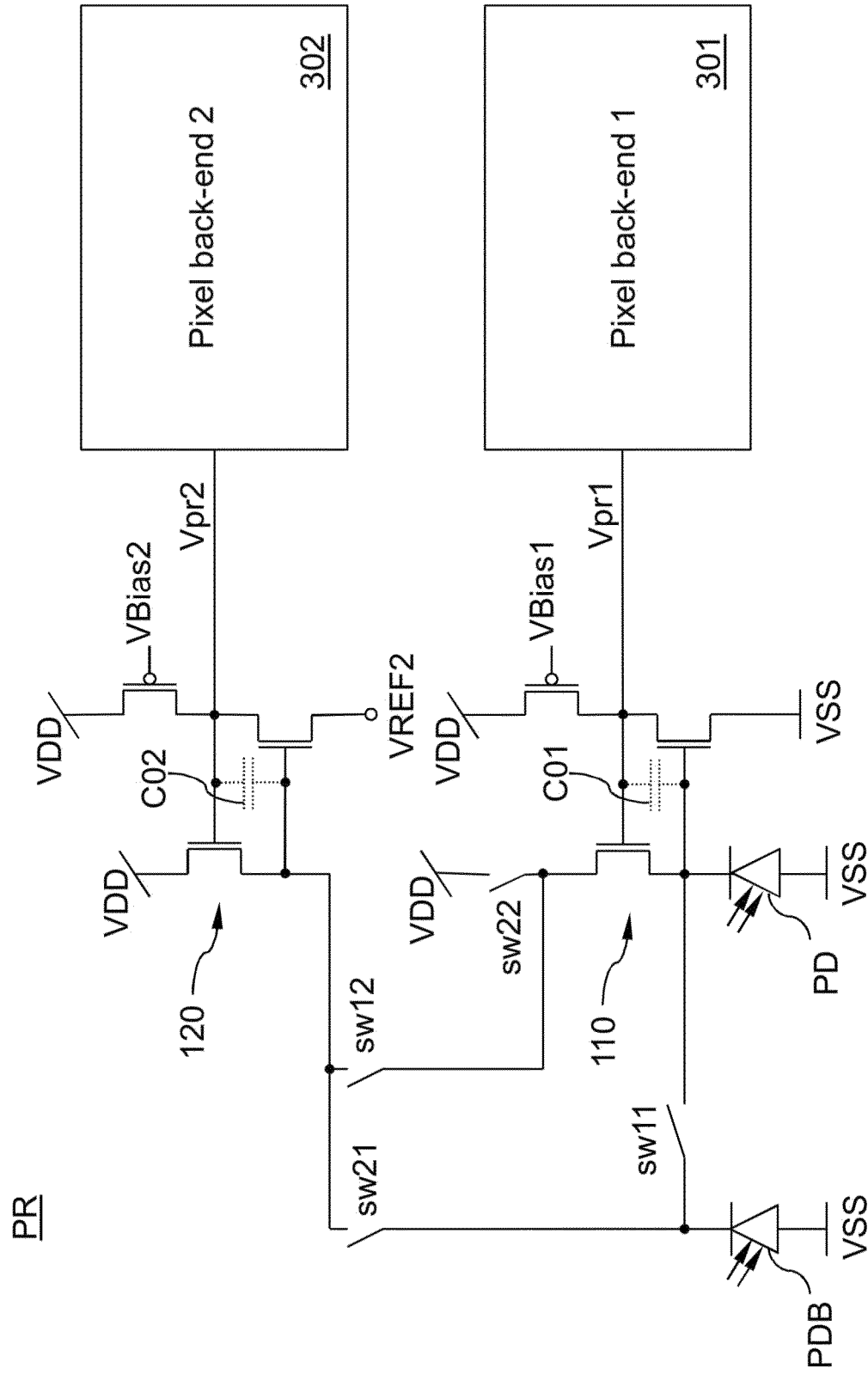
FIG. 9 is a schematic circuit diagram of a configurable photoreceptor module according to another embodiment.

In addition to the photoelectric conversion element PD, the first amplifier circuit 110, and the second amplifier circuit 120 of the photoreceptor module in FIG. 5, the photoreceptor module PR in FIG. 9 includes a supplementary photoelectric conversion element PDB and a switch arrangement sw11, sw12, sw21, sw22. An anode of the supplementary photoelectric conversion element PDB is electrically connected to the low supply potential VSS. The switch arrangement sw11, sw12, sw21, sw22 is configured to change between a first operating state and a second operating state.

In the first operating state of the switch arrangement sw11, sw12, sw21, sw22 the photoelectric conversion element PD and the first amplifier circuit 110 are electrically connected in series. In addition the supplementary photoelectric conversion element PDB and the controlled feedback path of the second amplifier circuit 120 are electrically connected in series.

In the second operating state of the switch arrangement sw11, sw12, sw21, sw22 the photoelectric conversion element PD and the supplementary photoelectric conversion element PDB are electrically connected in parallel. In addition, the controlled feedback paths of the first amplifier circuit (110) and the second amplifier circuit (120) are electrically connected in series.

The switch arrangement sw11, sw12, sw21, sw22 may include electronic switches such as n-channel or p-channel MOSFETs. For example, the switch arrangement sw11, sw12, sw21, sw22 may include four electronic switches. A pair of first electronic switches sw11, sw12 and a pair of second electronic switches sw21, sw22. The first electronic switches sw11, sw12 are on when the second electronic switches sw21, sw22 are off and vice versa.

A first one of the first electronic switches sw11 is between the cathode of the photoelectric conversion element PD and the cathode of the supplementary photoelectric conversion element PDB. A second one of the first electronic switches sw12 is between the controlled feedback path of the first amplifier circuit 110 and the controlled feedback path of the second amplifier circuit 110. If both first electronic switches sw11, sw12 are on (and all second electronic switches sw21, sw22 are off), the photoelectric conversion element PD and the supplementary photoelectric conversion element PDB are electrically connected in parallel. The first amplifier circuit 110 and the second amplifier circuit 120 form a photoreceptor module PR with two photoreceptor signals Vpr1, Vpr2 derived from one combined photoelectric conversion element PD & PDB (two-signals-per-pixel mode).

A first one of the second electronic switches sw21 is between the cathode of the supplementary photoelectric conversion element PDB and the input of the second amplifier circuit 120. A second one of the second electronic switches sw22 is between the high supply potential VDD and the controlled path of the feedback portion of the first amplifier circuit 110. If both second electronic switches sw21, sw22 are on (and all first switches sw11, sw12 are off), the photoelectric conversion module PR breaks down into two independent photoelectric conversion modules with one photoreceptor signal Vpr1, Vpr2 respectively (two-pixel mode).

The reference voltage VREF2 of the second amplifier circuit 120 may be connected to the low supply potential VSS or may have an auxiliary potential higher than the low supply potential VSS. Alternatively, a further switch may connect the reference voltage VREF to the low supply voltage VSS for the two-pixel mode and to the auxiliary potential for the two signal-per-pixel mode.

The switches sw11, sw12, sw21, sw22 may be configurable by hardware settings on manufacturing or assembly level, e.g. through fuses such that different types of solid-stage imaging devices with different parameters may be manufactured using almost the identical manufacturing process.

Alternatively, switch control signals may be provided by the controller 220 shown in FIGS. 1A, 1B in response to changing states of a process-oriented or time-oriented sequential control executed by the controller 220. For example, depending on operation conditions, which may depend on illumination conditions of an imaged scene or an illumination mode selected by an application or user, the solid-state imaging device with the photoreceptor module PR of FIG. 9 may be operated with high spatial resolution (two-pixel mode) or with lower spatial resolution but higher SNR and/or better temporal resolution (two-signals-per-pixel mode).

The photoreceptor module PR may further include a configurable first capacitance element CM1 electrically connected between the output and the input of the first amplifier circuit 110 and a configurable second capacitance element CM2 electrically connected between the output and the input of the second amplifier circuit 120 as described with reference to FIG. 20.

Figure 10:
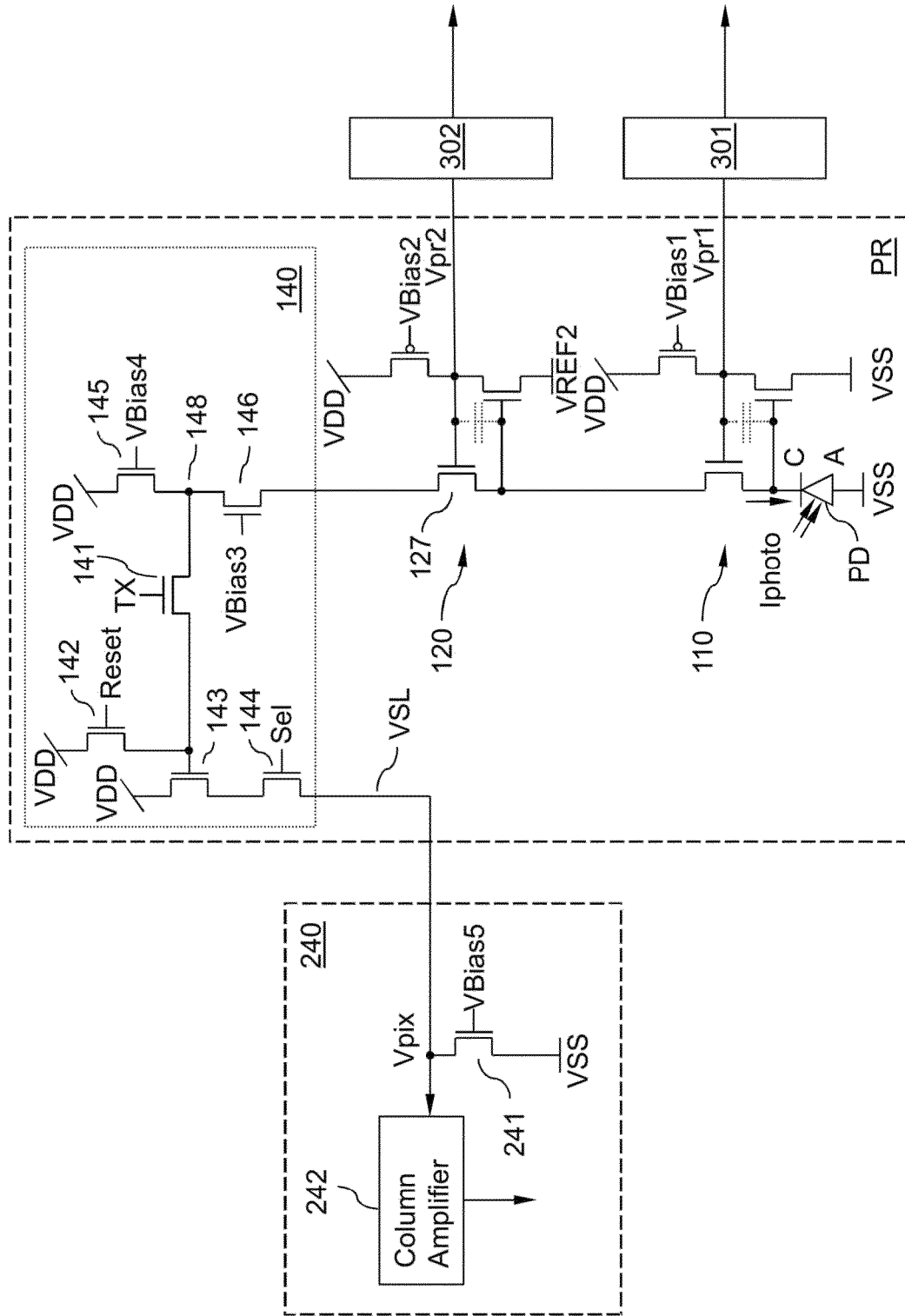
FIG. 10 is a simplified circuit diagram of a photoreceptor module including an intensity readout circuit according to an embodiment with simultaneous intensity readout and event detection.

FIG. 10 shows a photoreceptor module PR including an intensity readout circuit 140. The intensity readout circuit 140 transforms the photocurrent Iphoto flowing through the photoelectric conversion element PD into a voltage signal Vpix with a voltage level depending on a magnitude of the photocurrent Iphoto.

The intensity readout circuit 140 may be adapted to determine the magnitude of the photocurrent Iphoto through the photoelectric conversion element PD of the photoreceptor module PR at given points in time and outputs the voltage signal Vpix, which voltage level depends on the photocurrent Iphoto on a vertical signal line VSL. The vertical signal line VSL may be shared by all pixels 211 arranged along the same column of pixels in the pixel array.

In the illustrated embodiment of the intensity readout circuit 140, an n-channel anti-blooming MOSFET 145 and an n-channel decoupling MOSFET 146 are electrically connected in series between the high supply voltage VDD and the controlled path of the feedback portion of the second amplifier circuit 120. The anti-blooming MOSFET 145 and the decoupling MOSFET 146 are controlled by fixed bias voltages Vbias3, Vbias4 applied to the gates of the MOSFETs 145, 146.

By keeping the drain of the second feedback MOSFET 127 at roughly constant voltage, decoupling MOSFET 146 may basically decouple the second amplifier circuit 120 from voltage transients at the center node 148 between the MOSFETs 146, 147. Anti-blooming MOSFET 145 may ensure that the voltage at the center node 148 does not fall below a certain level given by the difference between Vbias4 and the threshold voltage of the anti-blooming MOSFET 145 in order to ensure proper operation of the second amplifier circuit 120.

The source of an n-channel transfer MOSFET 141 is electrically connected to the center node 148. A drain of the n-channel transfer MOSFET 141 is electrically connected to the gate of an n-channel amplifier MOSFET 143. The gate of the n-channel transfer MOSFET 141 receives a transfer signal TX.

The drain of an n-channel reset MOSFET 142 is electrically connected to the high supply potential VDD. A source of the reset MOSFET 142 is electrically connected to the gate of the amplifier MOSFET 143 and to the drain of the transfer MOSFET 141. The gate of the reset MOSFET 142 receives a reset signal RESET.

The reset signal RESET switches on the reset MOSFET 142 for a short time such that the gate of the amplifier MOSFET 143 is set to a potential close to the high supply potential VDD. With the reset MOSFET 142 switched off again, when the transfer signal TX switches on the transfer MOSFET 141, an amount of charge proportional to the magnitude of the photocurrent Iphoto is discharged from the gate of the amplifier MOSFET 143.

The amplifier MOSFET 143, an n-channel selection MOSFET 144, a vertical signal line VSL and an n-channel current source MOSFET 241 with biased gate are electrically connected in series in this order between the high supply potential VDD and the low supply potential VSS. The gate of the selection MOSFET 144 receives a selection signal Sel. When the selection signal Sel switches on the selection MOSFET 144, a voltage signal Vpix with a voltage level proportional to the amount of charge on the gate of the amplifier MOSFET 143 drops across the drain/source path of the current source MOSFET 241.

The current source MOSFET 241 and a column amplifier circuit 242 for amplifying and/or buffering the voltage signal Vpix may be integrated in the readout circuit 240 of the solid-stage imaging device 200 as illustrated in FIG. 1A. The column amplifier circuit 242 further processes the voltage signal Vpix, which voltage level is a function of the photocurrent Iphoto at that point in time, when the transfer MOSFET 141 has been in the on state.

Alternative embodiments of the intensity readout circuit 140 may get along without transfer MOSFET, wherein the reset MOSFET may replace the anti-blooming MOSFET 145, and wherein the source of such reset MOSFET is directly connected to the gate of the amplifier MOSET 143.

In the photoreceptor module of FIG. 10, the intensity detection circuit 140 and the amplifying circuits 110, 120 for event detection are electrically connected in series with respect to the photocurrent Iphoto, wherein evaluation of intensity and detection of events may be performed substantially contemporaneously.

Figure 11:
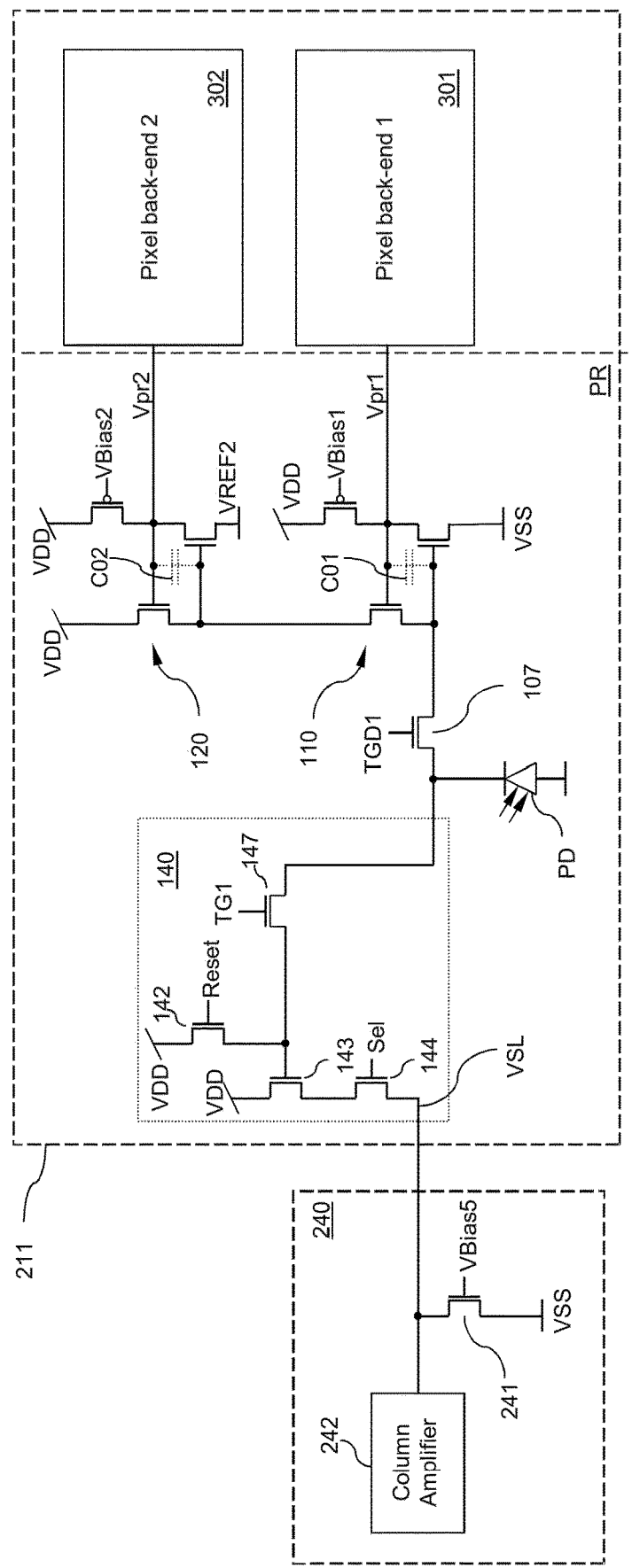
FIG. 11 is a simplified circuit diagram of a photoreceptor module including an intensity readout circuit according to an embodiment with sequential intensity readout and event detection.

The photoreceptor module PR in FIG. 11 includes a photocurrent routing circuit 107, 147. The photocurrent routing circuit 107, 147 electrically connects the photoelectric conversion element PD with the first amplifier circuit 110 in a first operating state. The photocurrent routing circuit 107, 147 electrically connects the photoelectric conversion element PD with the intensity readout circuit 140 in a second operating state.

In addition, the photocurrent routing circuit 107, 147 disconnects the photoelectric conversion element PD from the intensity readout circuit 140 in the first operating state and disconnects the photoelectric conversion element PD from the first amplifier circuit 110 in the second operating state.

The photocurrent routing circuit 107, 147 may include two electronic switches, e.g. MOSFETs. For example, a source of an n-channel first transfer MOSFET 107 is electrically connected to the cathode of the photoelectric conversion element PD. A drain of the first transfer MOSFET 107 is electrically connected to the input of the first amplifier circuit 110.

A source of an n-channel second transfer MOSFET 147 is electrically connected to the cathode C of the photoelectric conversion element PD. A drain of the second transfer MOSFET 147 is electrically connected to the source of the reset MOSFET 142 and to the gate of the amplifier MOSFET 143 as described with respect to FIG. 10.

The gate of the first transfer MOSFET 107 receives a first transfer signal TGD1. The gate of the second transfer MOSFET 147 receives a second transfer signal TG1. When the first transfer signal TGD1 switches on the first transfer MOSFET 107 and the second transfer signal TG1 switches off the second transfer MOSFET 147, the photoreceptor module PR is in an event detection mode. When the first transfer signal TGD1 switches off the first transfer MOSFET 107 and the second transfer signal TG1 switches on the second transfer MOSFET 147, the photoreceptor module PR is in an intensity readout mode.

Since in the intensity readout mode the first and second amplifier circuits 110, 120 for event detection are disconnected from the photoelectric conversion element PD, the intensity readout may be more precise and may deliver better image quality.

Figure 12:
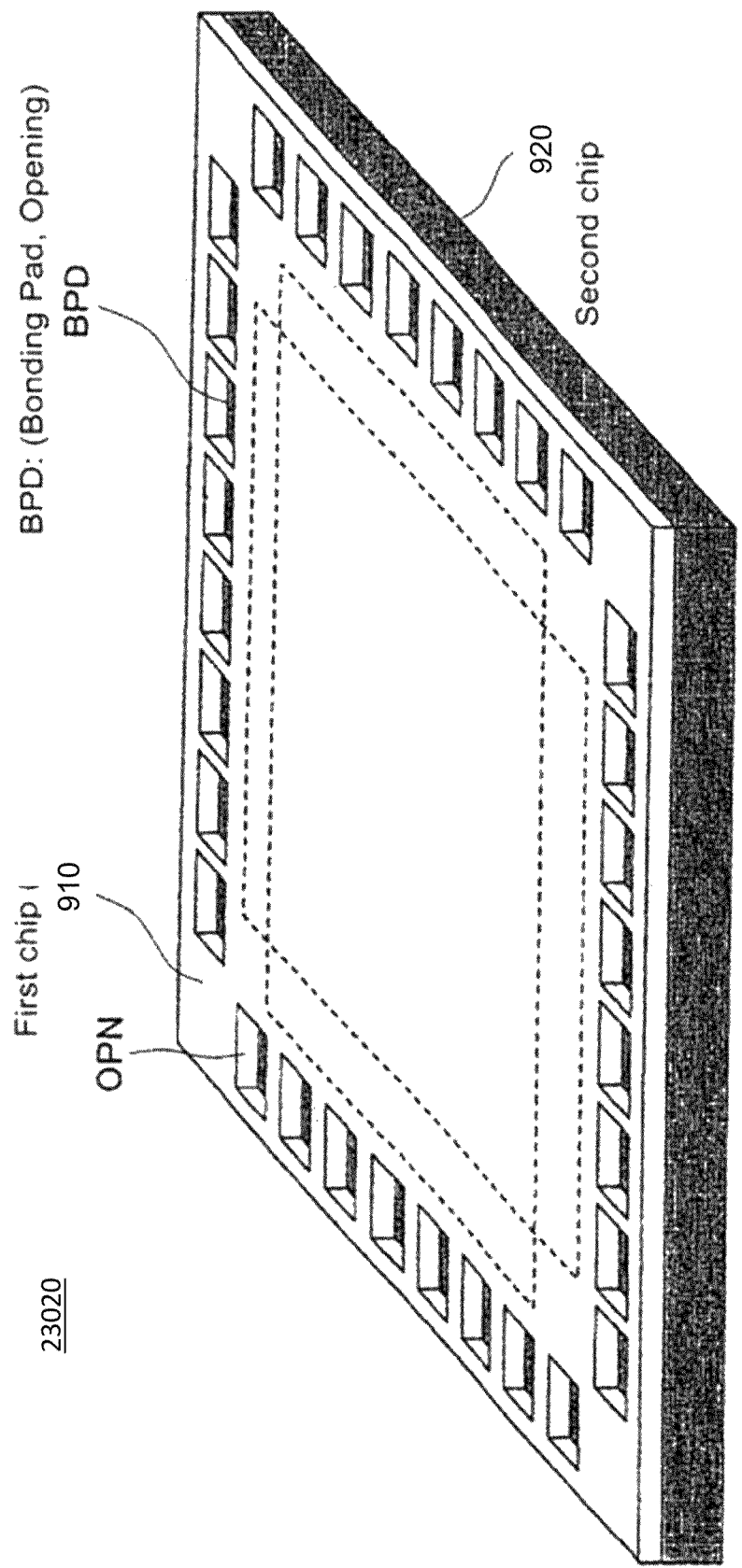
FIG. 12 is a simplified perspective view of a solid-state imaging device with laminated structure according to an embodiment of the present disclosure.

FIG. 12 is a perspective view showing an example of a laminated structure of a solid-state imaging device 23020 with a plurality of pixels arranged matrix-like in array form. Each pixel includes at least one photoelectric conversion element.

The solid-state imaging device 23020 has the laminated structure of a first chip (upper chip) 910 and a second chip (lower chip) 920.

The laminated first and second chips 910, 920 may be electrically connected to each other through TC(S)Vs (Through Contact (Silicon) Vias) formed in the first chip 910.

The solid-state imaging device 23020 may be formed to have the laminated structure in such a manner that the first and second chips 910 and 920 are bonded together at wafer level and cut out by dicing.

In the laminated structure of the upper and lower two chips, the first chip 910 may be an analog chip (sensor chip) including at least one analog component of each pixel, e.g., the photoelectric conversion elements arranged in array form. For example, the first chip 910 may include only the photoelectric conversion elements.

Alternatively, the first chip 910 may include further elements of each photoreceptor module. For example, the first chip 910 may include, in addition to the photoelectric conversion elements, at least some or all of the n-channel MOSFETs of the photoreceptor modules. Alternatively, the first chip 910 may include each element of the photoreceptor modules.

The first chip 910 may also include parts of the pixel back-ends 300. For example, the first chip 910 may include the memory capacitors, or, in addition to the memory capacitors sample/hold circuits and/or buffer circuits electrically connected between the memory capacitors and the event-detecting comparator circuits. Alternatively, the first chip 910 may include the complete pixel back-ends. With reference to FIG. 1A, the first chip 910 may also include at least portions of the readout circuit 240, the threshold generation circuit 230 and/or the controller 220.

The second chip 920 may be mainly a logic chip (digital chip) that includes the elements complementing the circuits on the first chip 910 to the solid-state imaging device 23020. The second chip 920 may also include analog circuits, for example circuits that quantize analog signals transferred from the first chip 910 through the TCVs.

The second chip 920 may have one or more bonding pads BPD and the first chip 910 may have openings OPN for use in wire-bonding to the second chip 920.

The solid-state imaging device 23020 with the laminated structure of the two chips 910, 920 may have the following characteristic configuration:

The electrical connection between the first chip 910 and the second chip 920 is performed through, for example, the TCVs. The TCVs may be arranged at chip ends or between a pad region and a circuit region. The TCVs for transmitting control signals and supplying power may be mainly concentrated at, for example, the four corners of the solid-state imaging device 23020, by which a signal wiring area of the first chip 910 can be reduced.

Figure 13A:
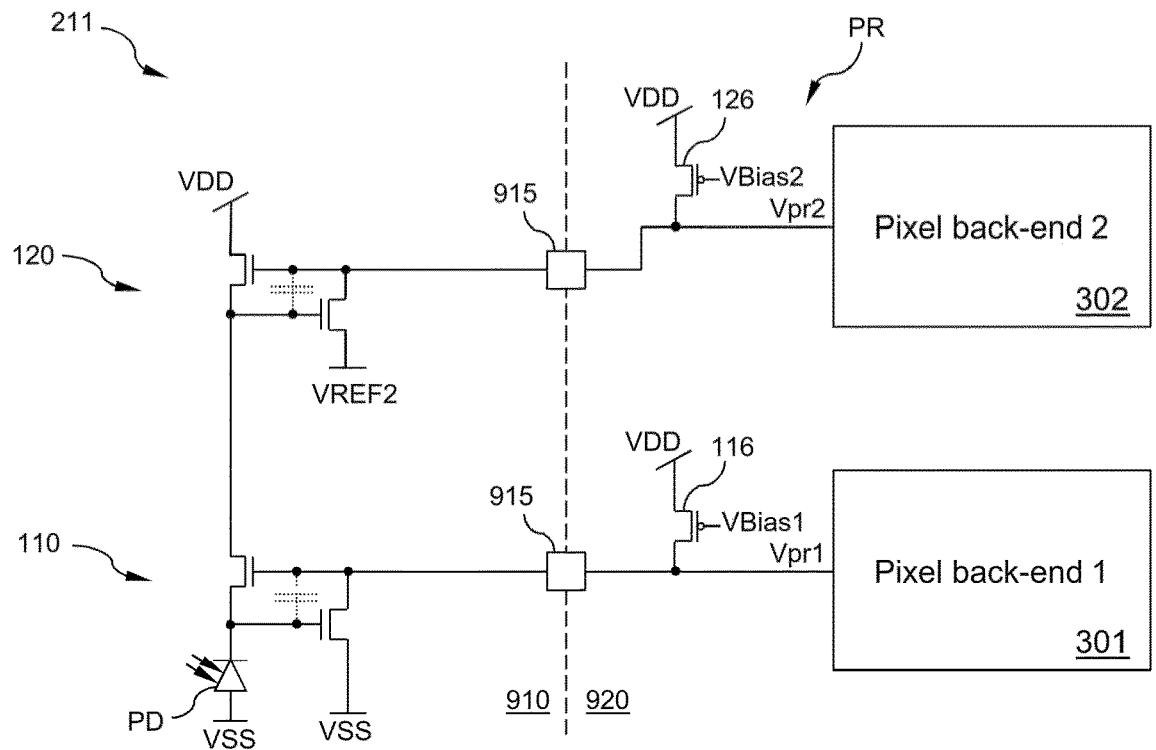
FIG. 13A is a schematic circuit diagram of a pixel with elements of the photoreceptor module and a photoelectric conversion element formed on a first chip of a solid-state imaging device with laminated structure according to an embodiment.
Figure 13B:
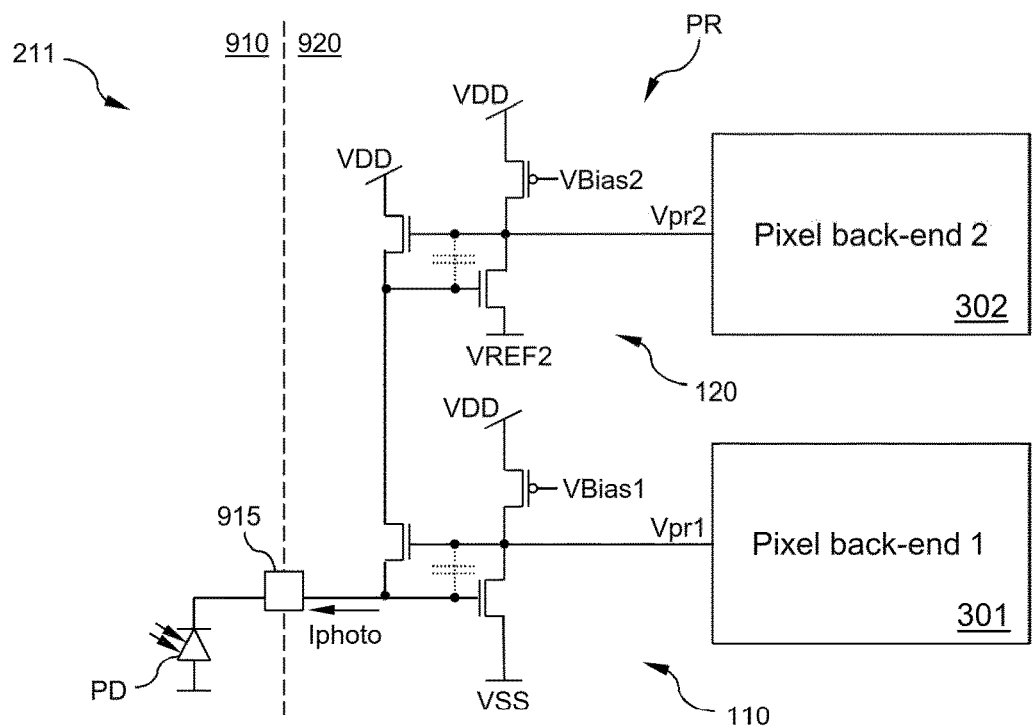
FIG. 13B is a schematic circuit diagram of a pixel with the photoreceptor circuit mainly formed on a second chip of a solid-state imaging device with laminated structure according to an embodiment.

FIG. 13A and FIG. 13B refer to the pixel 211 of FIG. 5 and show possible allocations of elements of the pixel 211 across the first chip 910 and the second chip 920 of FIG. 12.

In FIG. 13A the first chip 910 includes the photoelectric conversion element PD and the n-channel MOSFETs of the photoreceptor module PR. The second chip 920 includes the p-channel load MOSFETs 126 of the photoreceptor module PR and the pixel back-ends 301, 302. Two through contact vias 915 per pixel 211 pass the photoreceptor signals Vpr1, Vpr2 from the first chip 910 to the second chip 920.

Typically, the first chip 910 includes a p-type substrate and formation of p-channel MOSFETs typically implies the formation of n-doped wells separating the p-type source and drain regions of the p-channel MOSFETs from each other and from further p-type regions. Avoiding the formation of p-channel MOSFETs may therefore simplify the manufacturing process of the first chip 910.

In FIG. 13B the first chip 910 includes the photoelectric conversion element PD. The second chip 920 includes the n-channel MOSFETs and the p-channel load MOSFETs 126 of the photoreceptor module PR and the pixel back-ends 301, 302. For each pixel 211, one single through contact via 915 routes the photocurrent Iphoto from the first chip 910 to the second chip 920. The total number of through contact vias 915 for the pixels is not greater than the number of pixels such that the first chip 910 is less complex.

FIG. 14 refers to the pixel 211 of FIG. 7 and shows a possible allocation of elements of the pixel 211 across the first chip 910 and the second chip 920. The first chip 910 includes the photoelectric conversion element PD and the re-channel MOSFETs of the photoreceptor module PR. The second chip 920 includes the shared p-channel load MOSFET 106 of the photoreceptor module PR and the pixel back-ends 301, 302. Two through contact vias 915 per pixel 211 pass the photoreceptor signals Vpr1, Vpr2 from the first chip 910 to the second chip 920.

Figure 15:
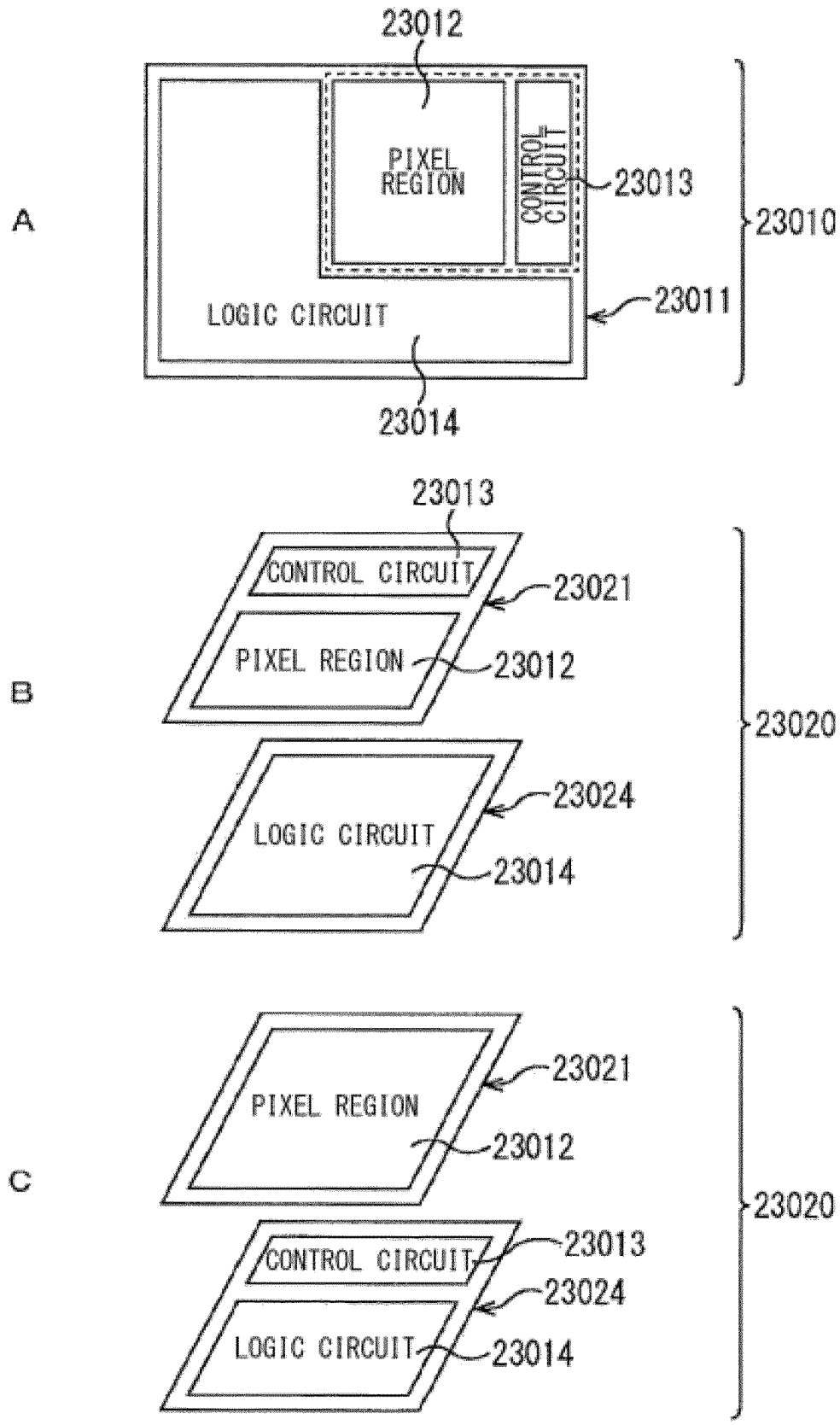
FIG. 15 illustrates simplified diagrams of configuration examples of a multi-layer solid-state imaging device to which a technology according to the present disclosure may be applied.

FIG. 15 illustrates schematic configuration examples of solid-state imaging devices 23010, 23020.

The single-layer solid-state imaging device 23010 illustrated in part A of FIG. 15 includes a single die (semiconductor substrate) 23011. Mounted and/or formed on the single die 23011 are a pixel region 23012 (photoelectric conversion elements), a control circuit 23013 (readout circuit, threshold generation circuit, controller), and a logic circuit 23014 (pixel back-end). In the pixel region 23012, pixels are disposed in an array form. The control circuit 23013 performs various kinds of control including control of driving the pixels. The logic circuit 23014 performs signal processing.

Parts B and C of FIG. 15 illustrate schematic configuration examples of multi-layer solid-state imaging devices 23020 with laminated structure. As illustrated in parts B and C of FIG. 15, two dies (chips), namely a sensor die 23021 (first chip) and a logic die 23024 (second chip), are stacked in a solid-state imaging device 23020. These dies are electrically connected to form a single semiconductor chip.

With reference to part B of FIG. 15, the pixel region 23012 and the control circuit 23013 are formed or mounted on the sensor die 23021, and the logic circuit 23014 is formed or mounted on the logic die 23024. The logic circuit 23014 may include at least parts of the pixel back-ends. The pixel region 23012 includes at least the photoelectric conversion elements.

With reference to part C of FIG. 15, the pixel region 23012 is formed or mounted on the sensor die 23021, whereas the control circuit 23013 and the logic circuit 23014 are formed or mounted on the logic die 23024.

According to another example (not illustrated), the pixel region 23012 and the logic circuit 23014, or the pixel region 23012 and parts of the logic circuit 23014 may be formed or mounted on the sensor die 23021, and the control circuit 23013 is formed or mounted on the logic die 23024.

Figure 16A:
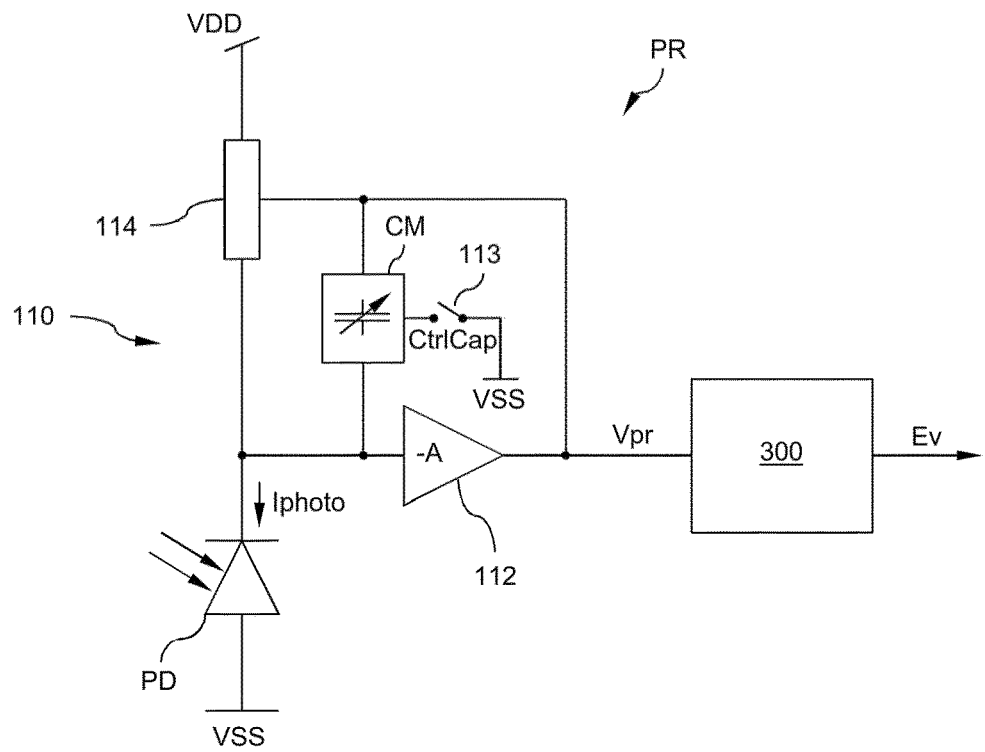
FIGS. 16A-16B are simplified circuit diagrams of photoreceptor modules with configurable capacitance elements according to further embodiments.

FIG. 16A shows a photoreceptor module PR with a photoelectric conversion element PD and with a first amplifier circuit 110. The first amplifier circuit 110 may include a first amplifier portion 112 and a first feedback portion 114. The input of the first amplifier portion 112 and a cathode C of the photoelectric conversion element PD are electrically connected to each other. A controlled path of the first feedback portion and the photoelectric conversion element PD may be electrically connected in this order between a high supply potential VDD and a low supply potential VS S.

The first amplifier portion 112 may include an inverting amplifier 102. The first amplifier portion 112 outputs a photoreceptor signal Vpr. The photoreceptor signal Vpr is fed forward to a pixel back-end 300 that outputs position information about events. The photoreceptor signal Vpr is fed back to control the first feedback portion 114. The first amplifier circuit 110 may have a logarithmic current-to-voltage (voltage-to-current) relation and may ensure that the voltage across the photoelectric conversion element PD remains almost constant.

An adjustable first capacitance element CM1 is electrically connected between the output and the input of the first amplifier circuit 110. For example, the first capacitance element CM1 may take at least a low capacitance state and a high capacitance state in response to a binary control signal CtrlCap applied to an input of the first capacitance element CM1. In the low capacitance state the capacitance of the first capacitance element CM1 is at most 95%, at most 90%, at most 50%, or at most 10% of the capacitance in the high capacitance state. Alternatively, the capacitance of the first capacitance element CM1 may be switchable between more than two discrete capacitance values. Alternatively, the capacitance of the first capacitance element CM1 may be continuously variable in response to an analog control signal CtrlCap.

The effective capacitance between the output and the input of the first amplifier circuit 110 affects both the pixel latency and the signal-to-noise ratio (SNR), wherein a high capacitance value improves the SNR but increases the pixel latency, and wherein a low capacitance value deteriorates the SNR but improves the temporal resolution.

As illustrated in FIG. 16A the control signal CtrlCap may be set by a hardware element 113 on manufacturing or assembly level, e.g. a fuse such that different types of solid-stage imaging devices with different parameters may be manufactured using almost the identical manufacturing process.

Figure 16B:
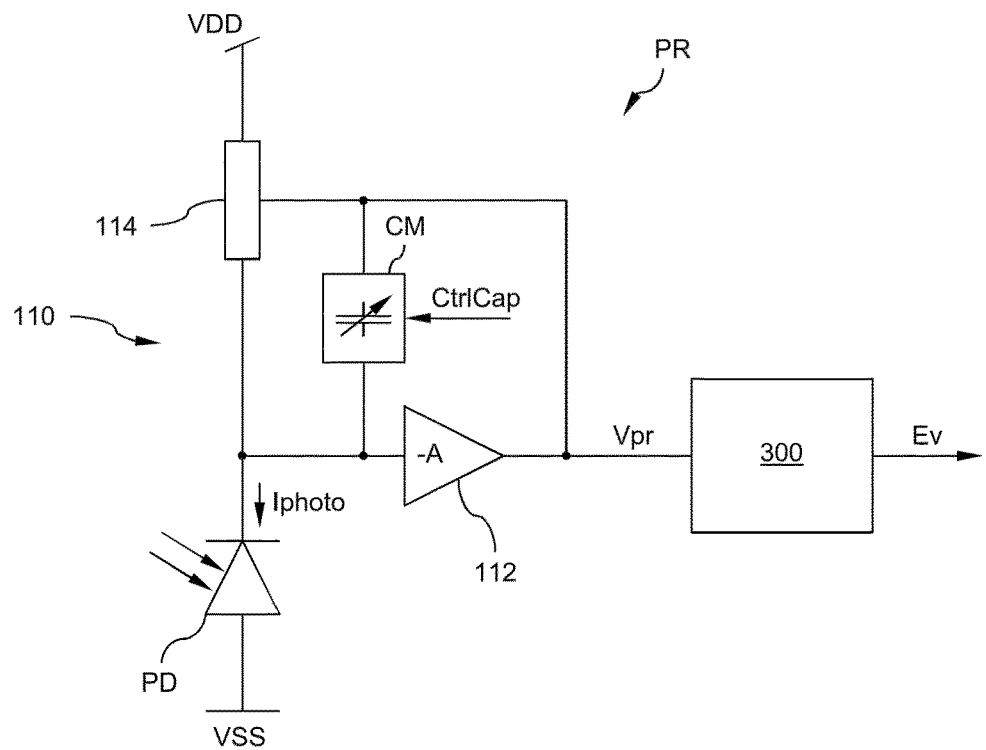

As illustrated in FIG. 16B the control signal CtrlCap may be received from the controller 220 shown in FIGS. 1A, 1B in response to changing states of a process-oriented or time-oriented sequential control executed by the controller 220. For example, depending on operation conditions, illumination conditions, and/or further characteristics of the imaged scene, the photoreceptor module PR may be operated in a mode with low SNR and high temporal resolution or in a mode with high SNR and low temporal resolution.

Within a solid-state imaging device with a plurality of photoreceptor modules PR, all photoreceptor modules PR may operate in the same mode. Alternatively, a first subset of the photoreceptor modules PR may operate in a mode with low SNR and high temporal resolution and a second, complementary subset of the photoreceptor module may operate in a mode with high SNR and low temporal resolution.

According to another embodiment, the control signal is not a function of illumination conditions but, e.g., of user settings.

In both cases, one single control signal CtrlCap may be used to synchronously control a group of photoreceptor modules PR in the same way, e.g. the photoreceptor modules PR of one column or one row of pixels. For example, one single control signal CtrlCap may synchronously change the capacitance of the first capacitance elements CM1 of a group of photoreceptor modules PR by approximately the same value. In particular, a level change of one single control signal CtrlCap may change the capacitance of the first capacitance elements CM1 of all photoreceptor modules PR of an array of pixels by approximately the same value.

Figure 17:
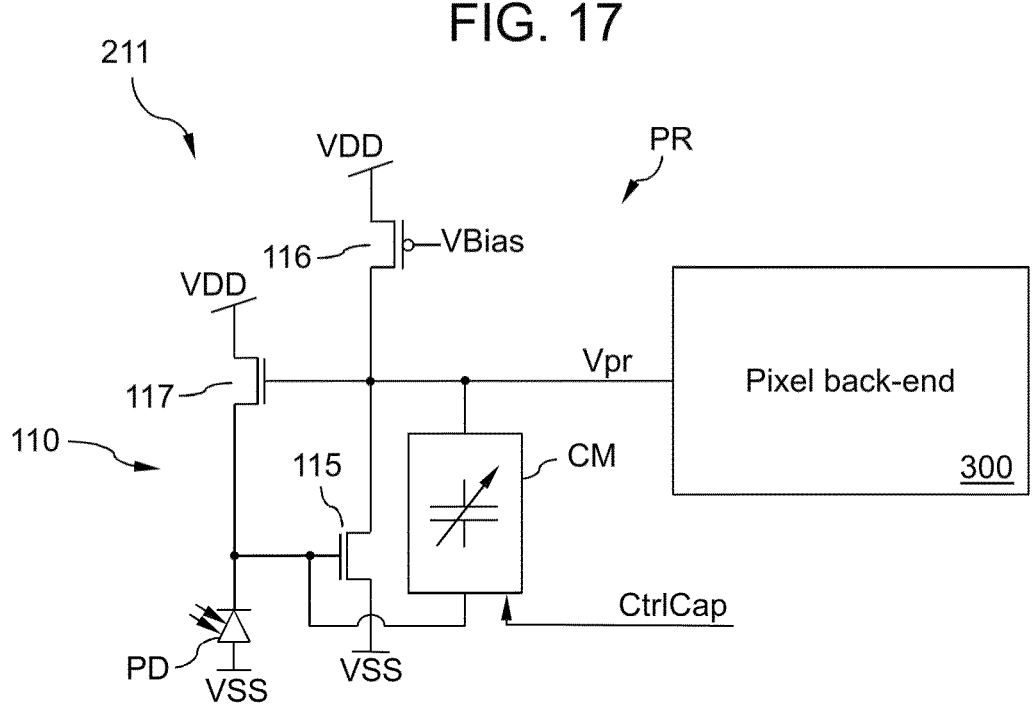
FIG. 17 is a schematic circuit diagram of a photoreceptor module with configurable capacitance element according to an embodiment using a logarithmic amplifier.

FIG. 17 shows details of a pixel 211 with a photoreceptor module PR including a first amplifier circuit 110 including two n-channel MOSFETs and a configurable capacitance element CM.

The first amplifier circuit 110 includes a first n-channel feedback MOSFET 117. A drain of the first feedback MOSFET 117 is connected to a high supply potential VDD. A source of the first feedback MOSFET 117 is connected to a cathode C of the photoelectric conversion element PD. An anode A of the photoelectric conversion element PD is electrically connected to a low supply potential VSS.

The first amplifier circuit 110 further includes a first n-channel amplifier MOSET 115 and a first load element. The source of the first amplifier MOSFET 115 is electrically connected to the low supply potential VSS. The first load element is electrically connected between the high supply potential VDD and the drain of the first amplifier MOSFET 115. The first load element may include the source-to-drain path of a first p-channel load MOSFET 116 with the gate electrically connected to a bias potential Vbias. The bias potential Vbias may be fixed.

The gate of the first amplifier MOSFET 115 and the Cathode C of the photoelectric conversion element PD are electrically connected with each other. An output node electrically connecting the drain of the first amplifier MOSFET 115, the gate of the first feedback MOSFET 117, and a first electrode of the first load element, e.g. the first load MOSFET 116, supplies a photoreceptor signal Vpr which is output to a pixel back-end 300. The configurable capacitance element CM may be electrically connected between the drain of the first amplifier MOSFET 115 and the cathode C of the photoelectric conversion element PD.

The first amplifier circuit 110 may be a logarithmic amplifier with a substantially logarithmic response, wherein the voltage of the photoreceptor signal Vpr is linearly related to the logarithm of the photocurrent Iphoto.

Figure 18:
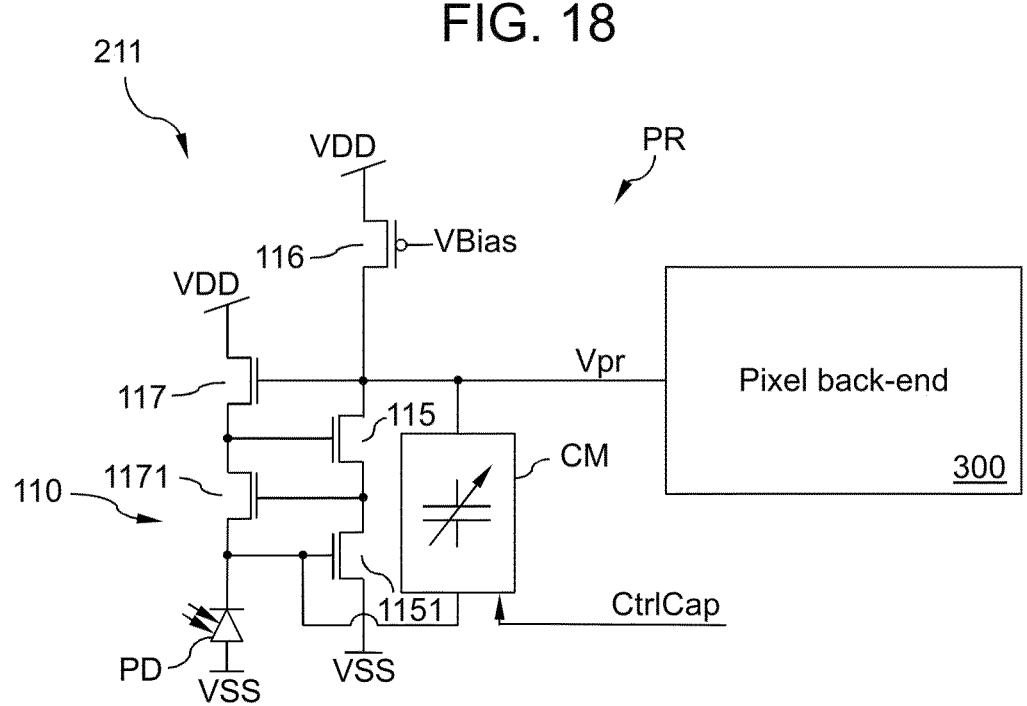
FIG. 18 is a schematic circuit diagram of a photoreceptor module with configurable capacitance element according to an embodiment using a multistage amplifier circuit.

FIG. 18 refers to an embodiment with the first amplifier circuit 110 having a circuit structure providing a higher gain than the first amplifier circuit 110 in FIG. 17.

The first amplifier circuit 110 of FIG. 18 may include a main stage with a first n-channel amplifier MOSET 115, a first load element, e.g. a p-channel load MOSFET 116 electrically connected between the high supply potential VDD and the drain of the first amplifier MOSFET 115 and with a first n-channel feedback MOSFET 117, which drain is electrically connected to the high supply potential VDD and which gate is electrically connected to the drain of the first amplifier MOSFET 115 as described with reference to FIG. 17.

The first amplifier circuit 110 further includes a pre-stage with an n-channel pre-stage feedback MOSFET 1171 and an n-channel pre-stage amplifier MOSFET 1151. A drain of the pre-stage amplifier MOSFET 1151 is electrically connected to the source of the first amplifier MOSFET 115. A source of the pre-stage amplifier MOSFET 1151 is electrically connected to the low supply potential VSS.

A gate of the pre-stage feedback MOSFET 1171 is electrically connected to the drain of the pre-stage amplifier MOSFET 1151 and to the source of the first amplifier MOSFET 115. A gate of the first amplifier MOSFET 115 is electrically connected with the drain of the pre-stage feedback MOSFET 1171 and with the source of the first feedback MOSFET 117. A gate of the pre-stage amplifier MOSFET 1151 is electrically connected to the cathode C of the photoelectric conversion element PD and to the source of the pre-stage feedback MOSFET 1171.

The configurable capacitance element CM is electrically connected between the drain of the first amplifier MOSFET 115 and the cathode C of the photoelectric conversion element PD.

The photoreceptor signal Vpr is output at the drain of the first amplifier MOSFET 115 and is fed forward to a pixel back-end 300. The pre-stage increases the gain of the first amplifier circuit 110.

Figure 19:
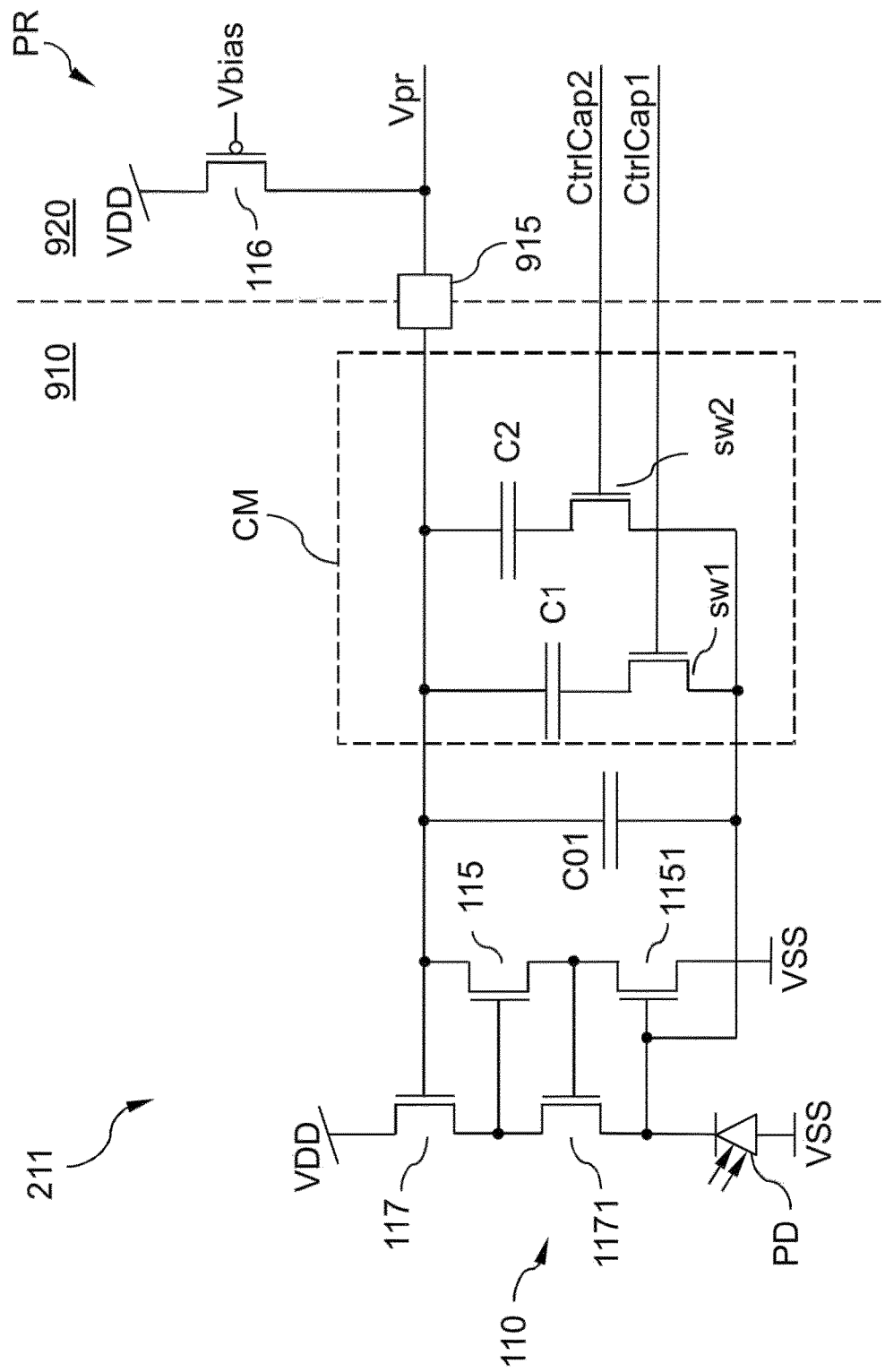
FIG. 19 is a schematic circuit diagram of a photoreceptor module with a configurable capacitance element using switches according to a further embodiment.

In FIG. 19 the configurable capacitance element CM includes two parallel paths, wherein a first path includes a first capacitive element C1 and a first electronic switch Sw1 electrically connected in series, and wherein a second path includes a second capacitive element C2 and a second electronic switch Sw1 electrically connected in series. In addition, a further capacitance C01 may be effective between the output and the input of the first amplifier circuit 110.

The capacitance of the first capacitive element C1 may differ from the capacitance of the second capacitive element C2. For example, the capacitance of the first capacitive element C1 may be at most 95%, at most 90%, at most 50% or at most 10% of the capacitance of the second capacitive element C2. Alternatively, the capacitance of the first capacitive element C1 and the capacitance of the second capacitive element C2 may be approximately equal.

The first switch Sw1 may be controlled through a first capacitance control signal CtrlCap1. The second switch Sw2 may be controlled through a second capacitance control signal CtrlCap2. The first and second capacitance control signal may control the first switch Sw1 and the second switch Sw2 in response to changing states of a process-oriented or time-oriented sequential control executed in the controller 220 of FIG. 1A.

A pair of one first and one second capacitance control signals CtrlCap1, CtrlCap2 may control a group of photoreceptor modules PR in the same way, e.g. the photoreceptor modules PR of one column or one row of pixels. For example, one single pair of first and second capacitance control signals CtrlCap1, CtrlCap2 may synchronously change the capacitance of the first and second capacitive elements C1, C2 of a group of photoreceptor modules PR by approximately the same value. In particular, one single pair of first and second capacitance control signals CtrlCap1, CtrlCap2 may change the capacitance of the first and second capacitive elements C1, C2 of all photoreceptor modules PR of an array of pixels by the same or by approximately the same value in response to, e.g. a change of the user settings and/or illumination conditions.

In addition, FIG. 19 shows a possible allocation of elements of the pixel 211 across a first chip 910 and a second chip 920 as described with reference to FIG. 12. The first chip 910 may include the photoelectric conversion element PD and the n-channel MOSFETs of the photoreceptor module PR. The second chip 920 may include the p-channel load MOSFET 116 of the photoreceptor module PR and the pixel back-end. One through contact via 915 per pixel 211 routes the photoreceptor signal Vpr from the first chip 910 to the second chip 920.

Figure 20:
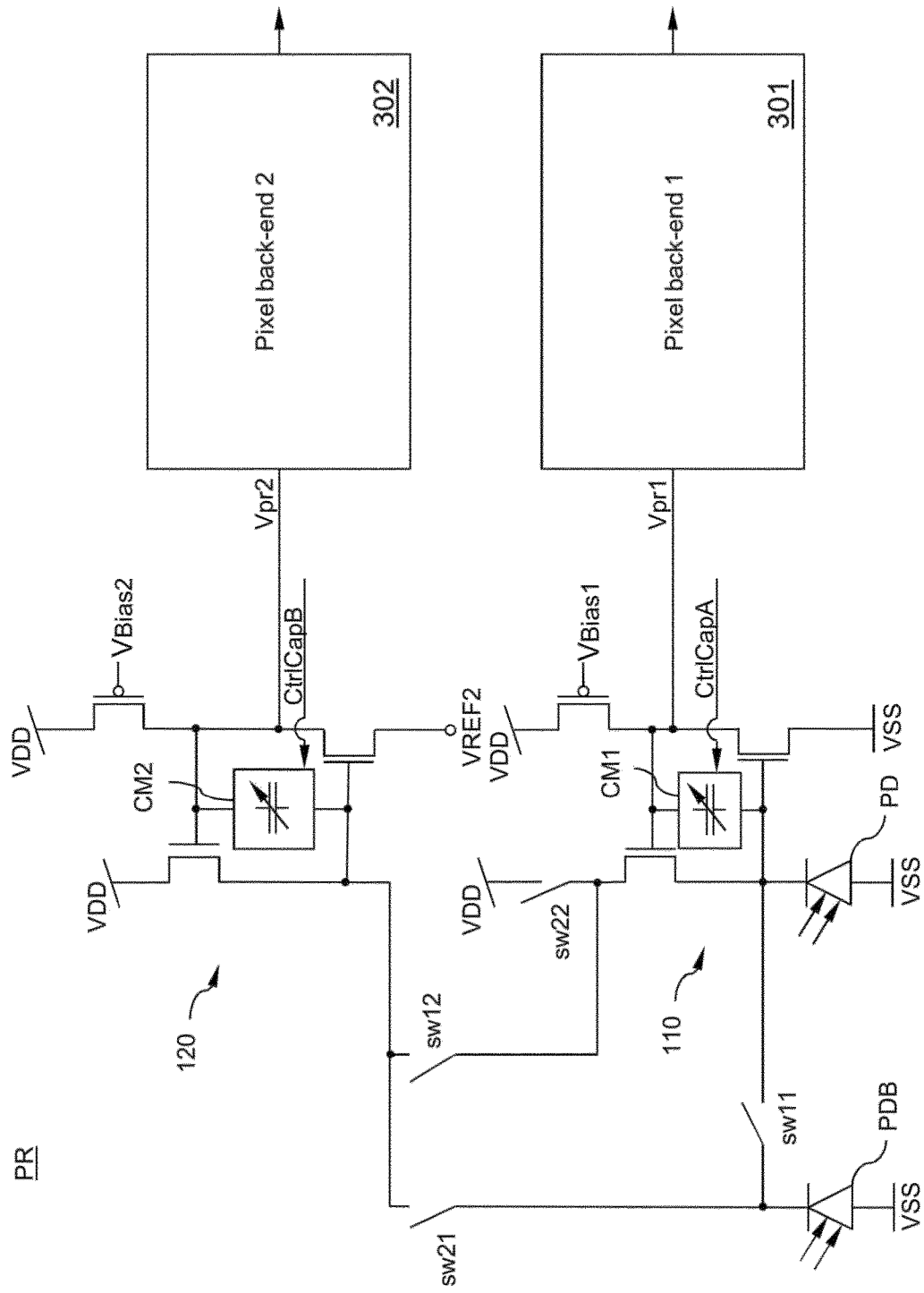
FIG. 20 is a circuit diagram of a configurable photoreceptor module as illustrated in FIG. 9 according to an embodiment with configurable capacitance elements.

In addition to the elements of the photoreceptor module PR as illustrated in FIG. 9, the photoreceptor module PR as illustrated in FIG. 20 includes a configurable first capacitance element CM1 electrically connected between the output and the input of the first amplifier circuit 110 and configurable second capacitance element CM2 electrically connected between the output and the input of the second amplifier circuit 120.

The first capacitance element CM1 may be controlled through a first capacitance control signal CtrlCapA. The second capacitance element CM2 may be controlled through a second capacitance control signal CtrlCapB. The first and second capacitance control signals CtrlCapA, CtrlCapB may control the first capacitance element CM1 and the second capacitance element CM2 in response to changing states of a process-oriented or time-oriented sequential control executed in the controller 220 of FIG. 1A.

<Application Example to Mobile Body>

The technology according to the present disclosure may be realized, e.g., as a device mounted in a mobile body of any type such as automobile, electric vehicle, hybrid electric vehicle, motorcycle, bicycle, personal mobility, airplane, drone, ship, or robot.

Figure 21:
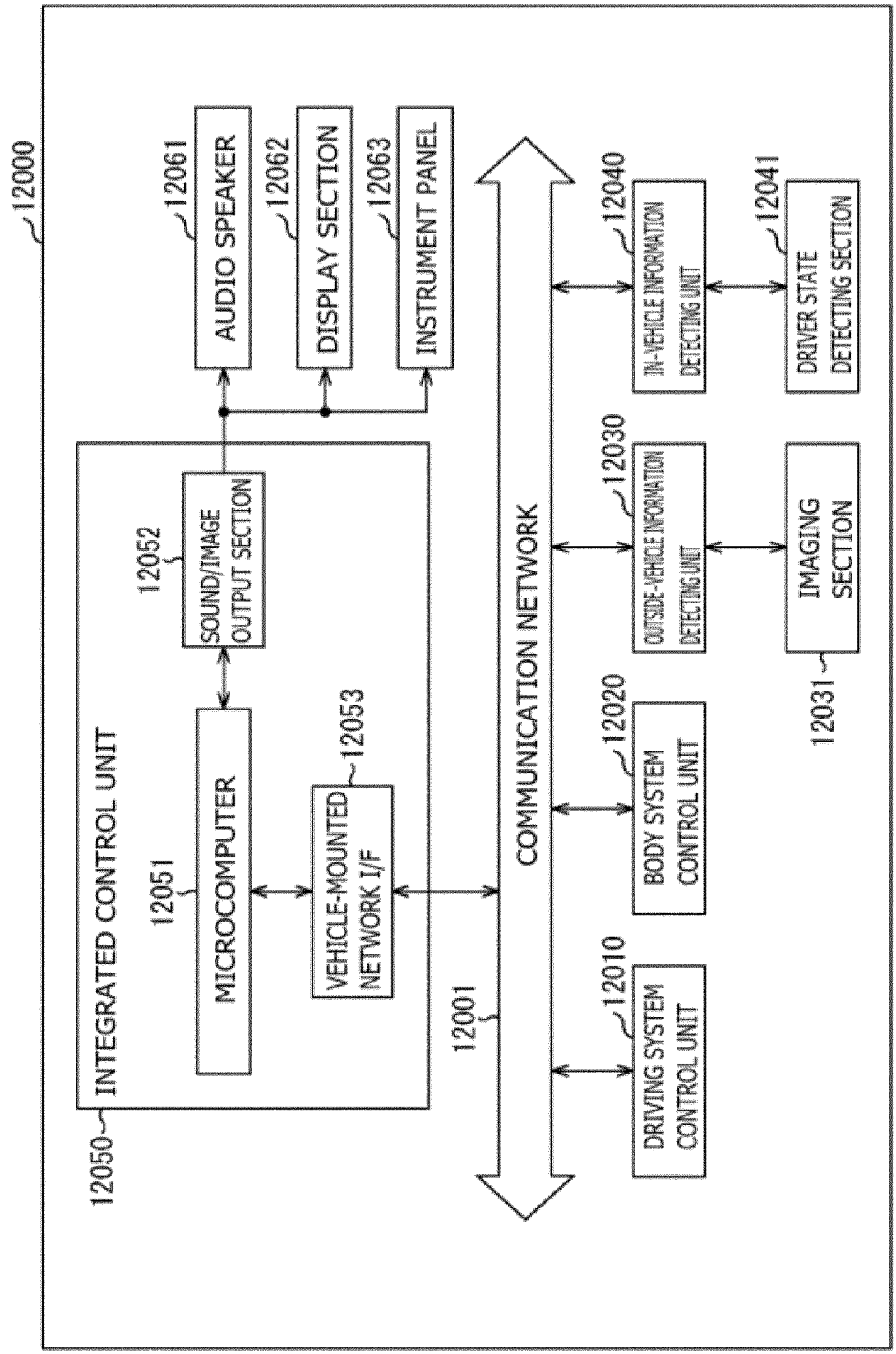
FIG. 21 is a block diagram depicting an example of a schematic configuration of a vehicle control system.

FIG. 21 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 21, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 imaging an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 may be or may include a solid-state imaging sensor with event detection and photoreceptor modules according to the embodiments of the present disclosure. The imaging section 12031 may output the electric signal as position information identifying pixels having detected an event. The light received by the imaging section 12031 may be visible light, or may be invisible light such as infrared rays or the like.

The in-vehicle information detecting unit 12040 detects information about the inside of the vehicle and may be or may include a solid-state imaging sensor with event detection and photoreceptor modules according to the embodiments of the present disclosure. The in-vehicle information detecting unit 12040 is, for example, connected with a driver state detecting section 12041 that detects the state of a driver. The driver state detecting section 12041, for example, includes a camera focused on the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound or an image to an output device capable of visually or audible notifying information to an occupant of the vehicle or the outside of the vehicle. In the example of FIG. 21, an audio speaker 12061, a display section 12062, and an instrument panel 12063 are illustrated as the output device. The display section 12062 may, for example, include at least one of an on-board display or a head-up display.

Figure 22:
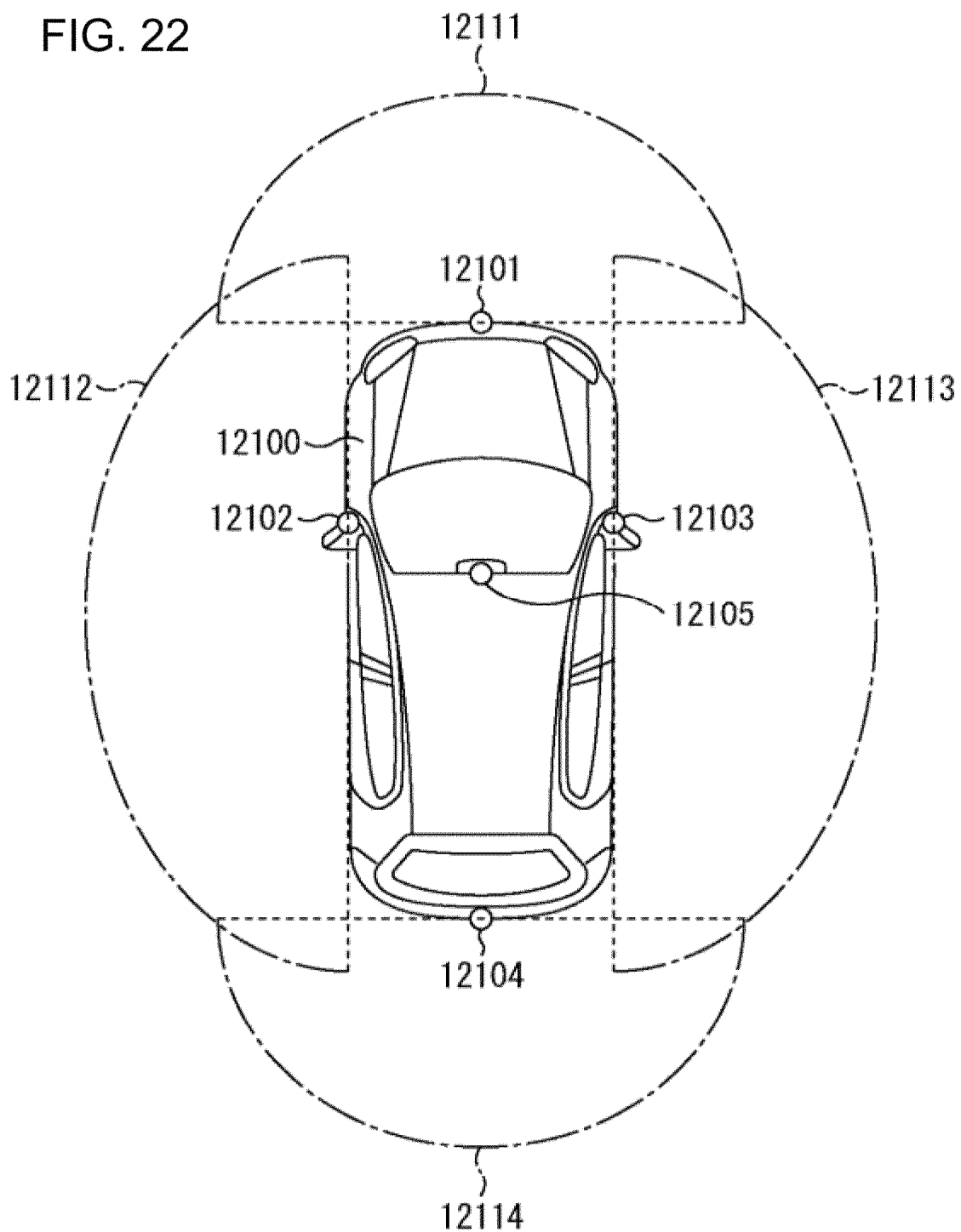
FIG. 22 is a diagram of assistance in explaining an example of installation positions of an outside-vehicle information detecting section and an imaging section of the vehicle control system of FIG. 21.

FIG. 22 is a diagram depicting an example of the installation position of the imaging section 12031, wherein the imaging section 12031 may include imaging sections 12101, 12102, 12103, 12104, and 12105.

The imaging sections 12101, 12102, 12103, 12104, and 12105 are, for example, disposed at positions on a front nose, side-view mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the side view mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 22 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the side view mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The example of the vehicle control system to which the technology according to an embodiment of the present disclosure is applicable has been described above. By applying the photoreceptor modules according to the embodiments for obtaining event-triggered image information, the image data transmitted through the communication network may be reduced and it may be possible to reduce power consumption without adversely affecting driving support.

Additionally, embodiments of the present technology are not limited to the above-described embodiments, but various changes can be made within the scope of the present technology without departing from the gist of the present technology.

The solid-state imaging device according to the present disclosure may be any device used for analyzing and/or processing radiation such as visible light, infrared light, ultraviolet light, and X-rays. For example, the solid-state imaging device may be any electronic device in the field of traffic, the field of home appliances, the field of medical and healthcare, the field of security, the field of beauty, the field of sports, the field of agriculture, the field of image reproduction or the like.

Specifically, in the field of image reproduction, the solid-state imaging device may be a device for capturing an image to be provided for appreciation, such as a digital camera, a smart phone, or a mobile phone device having a camera function. In the field of traffic, for example, the solid-state imaging device may be integrated in an in-vehicle sensor that captures the front, rear, peripheries, an interior of the vehicle, etc. for safe driving such as automatic stop, recognition of a state of a driver, or the like, in a monitoring camera that monitors traveling vehicles and roads, or in a distance measuring sensor that measures a distance between vehicles or the like.

In the field of home appliances, the solid-state imaging device may be integrated in any type of sensor that can be used in devices provided for home appliances such as TV receivers, refrigerators, and air conditioners to capture gestures of users and perform device operations according to the gestures. Accordingly the solid-state imaging device may be integrated in home appliances such as TV receivers, refrigerators, and air conditioners and/or in devices controlling the home appliances. Furthermore, in the field of medical and healthcare, the solid-state imaging device may be integrated in any type of sensor, e.g. a solid-state image device, provided for use in medical and healthcare, such as an endoscope or a device that performs angiography by receiving infrared light.

In the field of security, the solid-state imaging device can be integrated in a device provided for use in security, such as a monitoring camera for crime prevention or a camera for person authentication use. Furthermore, in the field of beauty, the solid-state imaging device can be used in a device provided for use in beauty, such as a skin measuring instrument that captures skin or a microscope that captures a probe. In the field of sports, the solid-state imaging device can be integrated in a device provided for use in sports, such as an action camera or a wearable camera for sport use or the like. Furthermore, in the field of agriculture, the solid-state imaging device can be used in a device provided for use in agriculture, such as a camera for monitoring the condition of fields and crops.

Note that the present technology can also be configured as described below:

(1) A photoreceptor module, including:
  a photoelectric conversion element;
  a first amplifier circuit comprising a first amplifier portion and a first feedback portion, wherein an input of the first amplifier portion and a cathode of the photoelectric conversion element are electrically connected; and
  a second amplifier circuit comprising a second amplifier portion and a second feedback portion, wherein a controlled path of the second feedback portion, a controlled path of the first feedback portion, and the photoelectric conversion element are electrically connected in series.

(2) The photoreceptor module according to (1),
  wherein an output of the first amplifier circuit is electrically connected to a pixel back-end and wherein an output of the second amplifier circuit is electrically connected to a pixel back-end.

(3) The photoreceptor module according to any of (1) and (2),
wherein a first capacitance effective between an output and an input of the first amplifier circuit and a second capacitance effective between an output and an input of the second amplifier circuit are different.

(4) The photoreceptor module according to any of (1) to (3), further including:
a first memory capacitor electrically connected to an output of the first amplifier circuit; and
a second memory capacitor electrically connected to an output of the second amplifier circuit.

(5) The photoreceptor module according to (4), further including:
an event detection circuit; and
a multiplexer circuit, wherein the multiplexer circuit is configured to electrically connect alternatingly the first memory capacitor or the second memory capacitor to an input of the event detection circuit.

(6) The photoreceptor module according to any of (1) to (5),
wherein an output of the first amplifier portion and an input of the first feedback portion are electrically connected, and
wherein an output of the second amplifier portion and an input of the second feedback portion are electrically connected.

(7) The photoreceptor module according to any of (1) to (6),
wherein the second amplifier circuit is configured such that an input voltage of the second amplifier portion is higher than an input voltage of the first amplifier portion.

(8) The photoreceptor module according to any of (1) to (6),
wherein controlled paths of the first amplifier portion and the second amplifier portion are electrically connected in series.

(9) The photoreceptor module according to any of (1) to (8),
wherein the second amplifier circuit has a higher gain than the first amplifier circuit.

(10) The photoreceptor module according to any of (1) to (9), further including:
a supplementary photoelectric conversion element; and
a switch arrangement configured to change between a first operating state and a second operating state,
wherein in the first operating state of the switch arrangement the photoelectric conversion element and the first amplifier circuit are electrically connected in series and the supplementary photoelectric conversion element and the controlled feedback of the second amplifier circuit are electrically connected in series, and
wherein in the second operating state of the switch arrangement the photoelectric conversion element and the supplementary photoelectric conversion element are electrically connected in parallel and the controlled feedback paths of the first amplifier circuit and the second amplifier circuit are electrically connected in series.

(11) The photoreceptor module according to any of (1) to (10), further including:
an intensity readout circuit configured to transform a photocurrent flowing through the photoelectric conversion element into a voltage signal with a voltage level depending on a magnitude of the photocurrent.

(12) The photoreceptor module according to (11), further including:
a photocurrent routing circuit, wherein in a first operating state of the photocurrent routing circuit the photoelectric conversion element is electrically connected with the first amplifier circuit and wherein in a second operating state of the photocurrent routing circuit the photoelectric conversion element is electrically connected with the intensity readout circuit.

(13) A photoreceptor module, including:
a photoelectric conversion element;
a first amplifier circuit, wherein an input of the first amplifier circuit and a cathode of the photoelectric conversion element are electrically connected;
a configurable first capacitance element electrically connected between an output of the first amplifier circuit and the input of the first amplifier circuit, wherein a capacitance of the first capacitance element is adjustable through a control signal applied to an input of the first capacitance element; and
a pixel back-end, wherein an output of the first amplifier circuit and an input of the pixel back-end are electrically connected.

(14) The photoreceptor module according to (13),
wherein the first amplifier circuit comprises a first amplifier portion and a first feedback portion, wherein an input of the first amplifier portion and the cathode of the photoelectric conversion element are electrically connected, and wherein the photoreceptor module further comprises:
a second amplifier circuit comprising a second amplifier portion and a second feedback portion, wherein a controlled path of the second feedback portion, a controlled path of the first feedback portion, and the photoelectric conversion element are electrically connected in series;
a configurable second capacitance element electrically connected between an output of the second amplifier circuit and the input of the first amplifier circuit, wherein a capacitance of the second capacitance element is adjustable through a control signal applied to an input of the second capacitance element;
a supplementary photoelectric conversion element; and
a switch arrangement configured to change between a first operating state and a second operating state,
wherein in the first operating state of the switch arrangement the photoelectric conversion element and the first amplifier circuit are electrically connected in series and the supplementary photoelectric conversion element and the controlled feedback of the second amplifier circuit are electrically connected in series, and
wherein in the second operating state of the switch arrangement the photoelectric conversion element and the supplementary photoelectric conversion element are electrically connected in parallel and the controlled feedback paths of the first amplifier circuit and the second amplifier circuit are electrically connected in series.

(15) A solid-state imaging device, including:
a pixel array comprising a plurality of the photoreceptor modules according to any of (1) to (14), wherein the photoelectric conversion elements of the photoreceptor modules are arranged in matrix form.

The invention claimed is:

1. A photoreceptor module, comprising:
a photoelectric conversion element;
a first amplifier circuit comprising a first amplifier stage and a first feedback circuit, wherein an input of the first amplifier stage and a cathode of the photoelectric conversion element are electrically connected; and
a second amplifier circuit comprising a second amplifier stage and a second feedback circuit, wherein a controlled path of the second feedback circuit, a controlled path of the first feedback circuit, and the photoelectric conversion element are electrically connected in series, wherein
an input of the second amplifier stage is electrically connected to a node between the controlled path of the first feedback circuit and the controlled path of the second feedback circuit.

2. The photoreceptor module according to claim 1, wherein an output of the first amplifier circuit is electrically connected to a pixel back-end and wherein an output of the second amplifier circuit is electrically connected to a pixel back-end.

3. The photoreceptor module according to claim 1, wherein a first capacitance effective between an output and an input of the first amplifier circuit and a second capacitance effective between an output and an input of the second amplifier circuit are different.

4. The photoreceptor module according to claim 1, further comprising:
a first memory capacitor electrically connected to an output of the first amplifier circuit; and
a second memory capacitor electrically connected to an output of the second amplifier circuit.

5. The photoreceptor module according to claim 4, further comprising:
an event detection circuit; and
a multiplexer circuit, wherein the multiplexer circuit is configured to electrically connect alternatingly the first memory capacitor or the second memory capacitor to an input of the event detection circuit.

6. The photoreceptor module according to claim 1, wherein an output of the first amplifier stage and an input of the first feedback circuit are electrically connected, and
wherein an output of the second amplifier stage and an input of the second feedback circuit are electrically connected.

7. The photoreceptor module according to claim 1, wherein the second amplifier circuit is configured such that an input voltage of the second amplifier stage is higher than an input voltage of the first amplifier stage.

8. The photoreceptor module according to claim 1, wherein controlled paths of the first amplifier stage and the second amplifier stage are electrically connected in series.

9. The photoreceptor module according to claim 1, wherein the second amplifier circuit has a higher gain than the first amplifier circuit.

10. The photoreceptor module according to claim 1, further comprising:
a supplementary photoelectric conversion element; and
a switch arrangement configured to change between a first operating state and a second operating state,
wherein in the first operating state of the switch arrangement the photoelectric conversion element and the first amplifier circuit are electrically connected in series and the supplementary photoelectric conversion element and the controlled feedback of the second amplifier circuit are electrically connected in series, and
wherein in the second operating state of the switch arrangement the photoelectric conversion element and the supplementary photoelectric conversion element are electrically connected in parallel and the controlled feedback paths of the first amplifier circuit and the second amplifier circuit are electrically connected in series.

11. The photoreceptor module according to claim 1, further comprising:
an intensity readout circuit configured to transform a photocurrent flowing through the photoelectric conversion element into a voltage signal with a voltage level depending on a magnitude of the photocurrent.

12. The photoreceptor module according to claim 11, further comprising:
a photocurrent routing circuit, wherein in a first operating state of the photocurrent routing circuit the photoelectric conversion element is electrically connected with the first amplifier circuit and wherein in a second operating state of the photocurrent routing circuit the photoelectric conversion element is electrically connected with the intensity readout circuit.

13. A photoreceptor module, comprising:
a photoelectric conversion element;
a first amplifier circuit, wherein an input of the first amplifier circuit and a cathode of the photoelectric conversion element are electrically connected;
a configurable first capacitance element electrically connected between an output of the first amplifier circuit and the input of the first amplifier circuit, wherein a capacitance of the first capacitance element is adjustable through a control signal applied to an input of the first capacitance element; and
a pixel back-end, wherein an output of the first amplifier circuit and an input of the pixel back-end are electrically connected.

14. The photoreceptor module according to claim 13, wherein the first amplifier circuit comprises a first amplifier stage and a first feedback circuit, wherein an input of the first amplifier stage and the cathode of the photoelectric conversion element are electrically connected, and wherein the photoreceptor module further comprises:
a second amplifier circuit comprising a second amplifier stage and a second feedback circuit, wherein a controlled path of the second feedback circuit, a controlled path of the first feedback circuit, and the photoelectric conversion element are electrically connected in series;
a configurable second capacitance element electrically connected between an output of the second amplifier circuit and the input of the first amplifier circuit, wherein a capacitance of the second capacitance element is adjustable through a control signal applied to an input of the second capacitance element;
a supplementary photoelectric conversion element; and
a switch arrangement configured to change between a first operating state and a second operating state,
wherein in the first operating state of the switch arrangement the photoelectric conversion element and the first amplifier circuit are electrically connected in series and the supplementary photoelectric conversion element and the controlled feedback of the second amplifier circuit are electrically connected in series, and
wherein in the second operating state of the switch arrangement the photoelectric conversion element and the supplementary photoelectric conversion element are electrically connected in parallel and the controlled feedback paths of the first amplifier circuit and the second amplifier circuit are electrically connected in series.

15. A solid-state imaging device, comprising:
a pixel array comprising a plurality of photoreceptor modules,
wherein each photoreceptor module comprises
a photoelectric conversion element,
a first amplifier circuit comprising a first amplifier stage and a first feedback circuit, wherein an input of the first amplifier stage and a cathode of the photoelectric conversion element are electrically connected, and
a second amplifier circuit comprising a second amplifier stage and a second feedback circuit, wherein a controlled path of the second feedback circuit, a controlled path of the first feedback circuit, and the photoelectric conversion element are electrically connected in series, wherein
an input of the second amplifier stage is electrically connected to a node between the controlled path of the first feedback circuit and the controlled path of the second feedback circuit, and
the photoelectric conversion elements of the photoreceptor modules are arranged in matrix form.

16. The photoreceptor module of claim 1, wherein
the first feedback circuit comprises a first feedback MOSFET and the second feedback circuit comprises a second feedback MOSFET, and
a source of the second feedback MOSFET is electrically connected to a drain of the first feedback MOSFET.

17. The photoreceptor module of claim 1, wherein
controlled paths of the first amplifier stage and the second amplifier stage are electrically connected in series, and
the first and second amplifier stages share a common load element.

18. The photoreceptor module of claim 13, wherein
the configurable first capacitance element comprises at least a first capacitive element in series with a first electronic switch and a second capacitive element in series with a second electronic switch, the first and second capacitive elements and associated switches being connected in parallel with each other.

19. The photoreceptor module of claim 1, further comprising:
a first output buffer circuit coupled to an output of the first amplifier circuit; and
a second output buffer circuit coupled to an output of the second amplifier circuit.

20. The solid-state imaging device of claim 15, wherein
the photoelectric conversion element and n-channel MOSFETs of the first and second amplifier circuits are formed on a first chip, and wherein p-channel MOSFETs of the first and second amplifier circuits are formed on a second chip, the first and second chips being laminated together.

* * * * *